(12) United States Patent
Yu et al.

(10) Patent No.: US 7,638,800 B2
(45) Date of Patent: Dec. 29, 2009

(54) WIRE FOR A DISPLAY DEVICE, A METHOD FOR MANUFACTURING THE SAME, A THIN FILM TRANSISTOR ARRAY PANEL INCLUDING THE WIRE, AND A METHOD FOR MANUFACTURING THE SAME

(75) Inventors: Seung-Hee Yu, Suwon (KR); Mun-Pyo Hong, Seongnam (KR); Soo-Guy Rho, Suwon (KR); Nam-Seok Rho, Kyungki-do (KR); Keun-Kyu Song, Daejeon (KR); Hee-Hwan Choe, Incheon (KR); Bo-Sung Kim, Seoul (KR); Sang-Gab Kim, Seoul (KR); Sung-Chul Kang, Yongin (KR); Hong-Sick Park, Yongin (KR)

(73) Assignee: Samsung Electronics Co., Ltd. (KR)

( * ) Notice: Subject to any disclaimer, the term of this patent is extended or adjusted under 35 U.S.C. 154(b) by 245 days.

(21) Appl. No.: 10/501,597
(22) PCT Filed: Jul. 29, 2002
(86) PCT No.: PCT/KR02/01434
§ 371 (c)(1),
(2), (4) Date: Apr. 12, 2005
(87) PCT Pub. No.: WO03/060601
PCT Pub. Date: Jul. 24, 2003

(65) Prior Publication Data
US 2005/0173732 A1 Aug. 11, 2005

(30) Foreign Application Priority Data
Jan. 15, 2002 (KR) ............................ 2002-0002230
Mar. 25, 2002 (KR) ............................ 2002-0016079

(51) Int. Cl.
*H01L 21/84* (2006.01)
(52) U.S. Cl. ........................... 257/59; 257/60; 257/768; 257/771; 257/E21.279; 438/158
(58) Field of Classification Search .................. 257/59, 257/72, 764–765, 770–771, E21.413, 60, 257/768, E21.293, E21.414, E29.151; 438/30, 438/158
See application file for complete search history.

(56) References Cited

U.S. PATENT DOCUMENTS 5,243,202 A * 9/1993 Mori et al. ..................... 257/59
(Continued)

FOREIGN PATENT DOCUMENTS

JP 09090406 4/1997
(Continued)

OTHER PUBLICATIONS

PCT International Search Report; International Application No. PCT/KR02/01434; International filing date: Jul. 29, 2002; Date of Mailing: Nov. 29, 2002.

*Primary Examiner*—Zandra Smith
*Assistant Examiner*—Tsz K Chiu
(74) *Attorney, Agent, or Firm*—Cantor Colburn LLP

(57) ABSTRACT5

First, a Cr film and a CrOx film are deposited and patterned using an etchant including 8-12% $Ce(NH_4)_2(NO3)_6$, 10-20% $NH_3$ and remaining ultra pure water to form a gate wire including a plurality of gate lines, a plurality of gate electrodes and a plurality of gate pads. Next, a gate insulating film, a semiconductor layer and an ohmic contact layer are formed in sequence. A Cr film and CrOx film are deposited in sequence and patterned using an etchant including 8-12% $Ce(NH_4)_2(NO_3)_6$, 10-20% $NH_3$ and remaining ultra pure water to form a data wire including a plurality of data lines, a plurality of source electrodes, a plurality of drain electrodes and a plurality of data pads. A passivation layer is deposited and patterned to form a plurality of contact holes respectively exposing the drain electrodes, the gate pads and the data pads. A transparent conductive material or a reflective conductive material is deposited and patterned to form a plurality of pixel electrodes, a plurality of subsidiary gate pads and a plurality of subsidiary data pads electrically connected to the drain electrodes, the gate pads and the data pads, respectively. The gate lines and the data lines with low reflectance are used as a light-blocking film for blocking the light leakage between the pixel areas, and do not increase the black brightness. Accordingly, a separate black matrix need not be provided on the color filter panel, thereby securing both aperture ratio of the pixel and high contrast ratio.

14 Claims, 32 Drawing Sheets

U.S. PATENT DOCUMENTS

| | | | |
|---|---|---|---|
| 5,496,752 A * | 3/1996 | Nasu et al. | 438/30 |
| 5,825,437 A * | 10/1998 | Seo et al. | 349/46 |
| 5,905,589 A | 5/1999 | Tanaka et al. | 359/230 |
| 6,281,552 B1 * | 8/2001 | Kawasaki et al. | 257/350 |
| 2002/0196386 A1 * | 12/2002 | Grace et al. | 349/61 |

FOREIGN PATENT DOCUMENTS

| | | |
|---|---|---|
| JP | 09116161 | 5/1997 |
| JP | 09152506 | 6/1997 |
| JP | 09230124 | 9/1997 |
| JP | 11212076 | 8/1999 |
| JP | 2000122093 | 4/2000 |
| JP | 2001005038 | 1/2001 |
| JP | 2001033801 | 2/2001 |
| JP | 2001222001 | 8/2001 |
| JP | 2001358343 | 12/2001 |
| KR | 10-0247628 | 12/1999 |
| KR | 1020010097057 | 11/2001 |
| KR | 100471773 | 2/2005 |

* cited by examiner

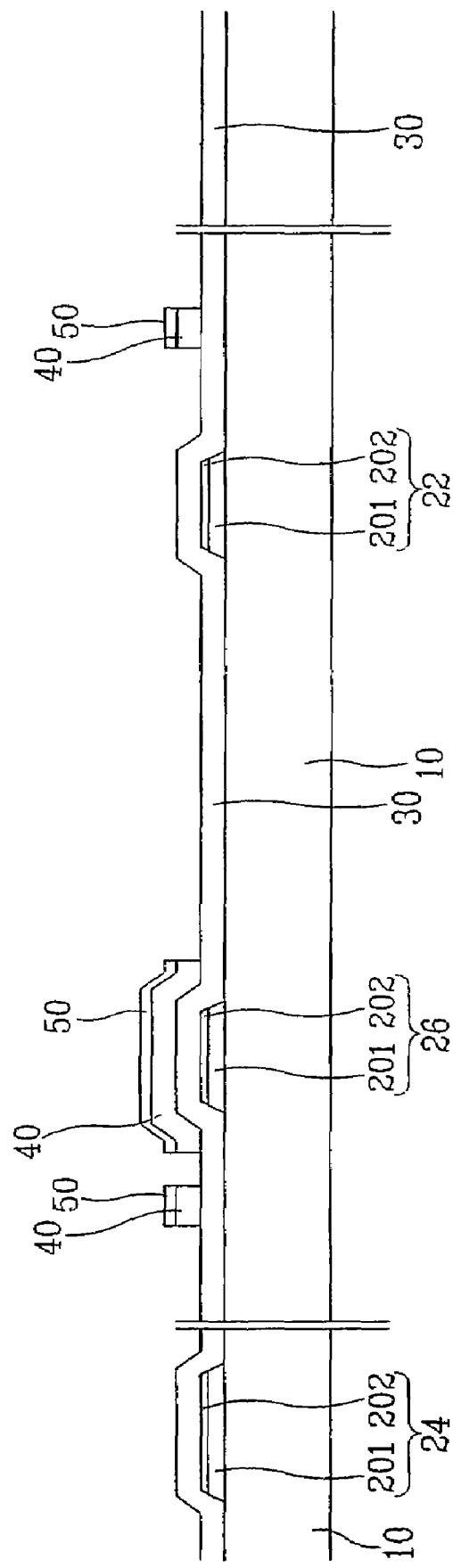

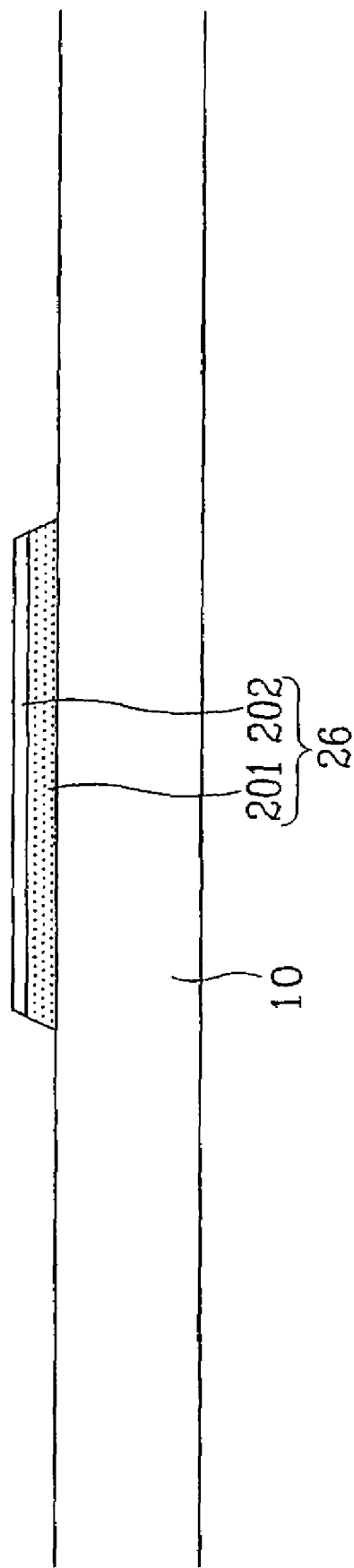

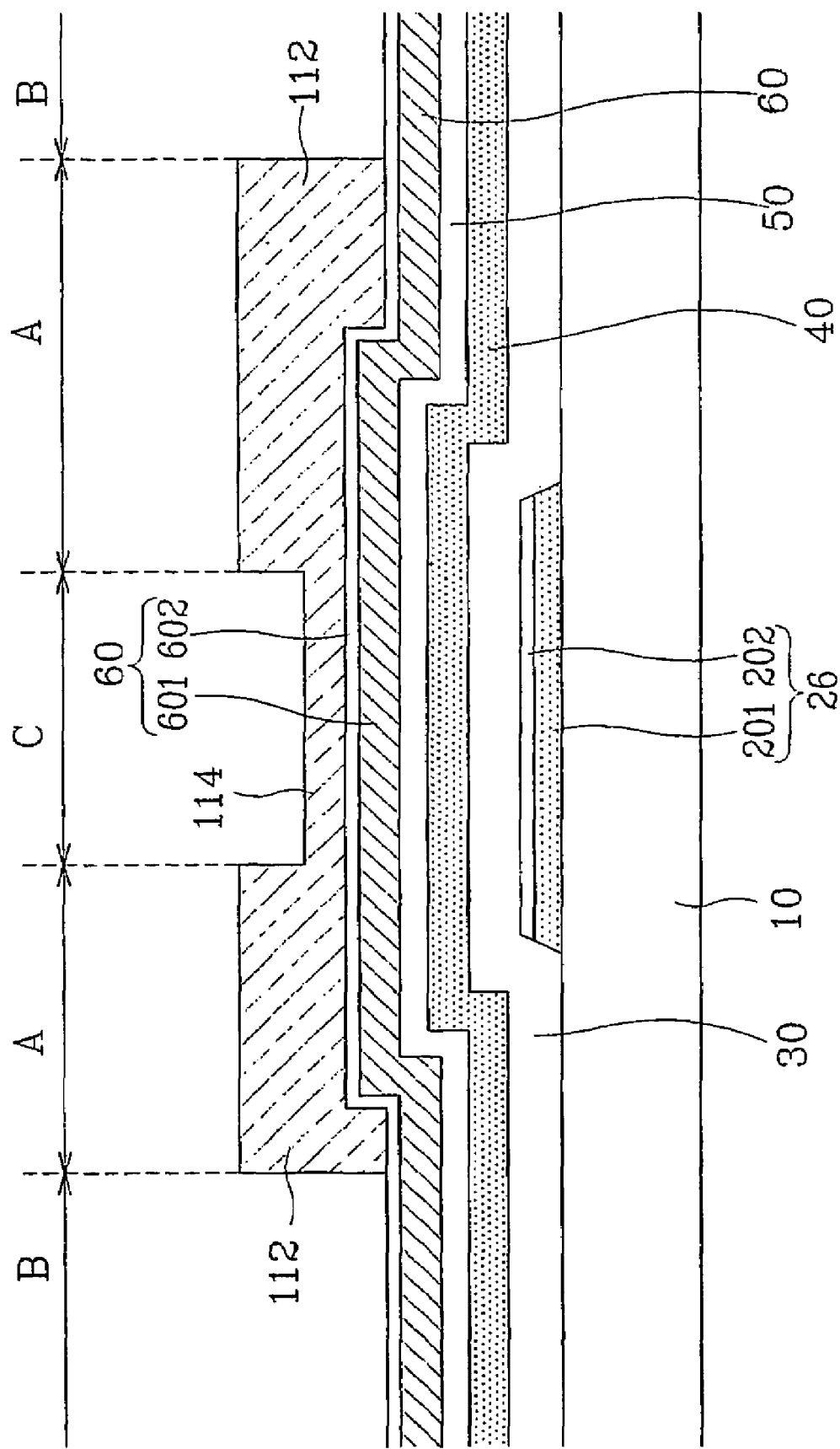

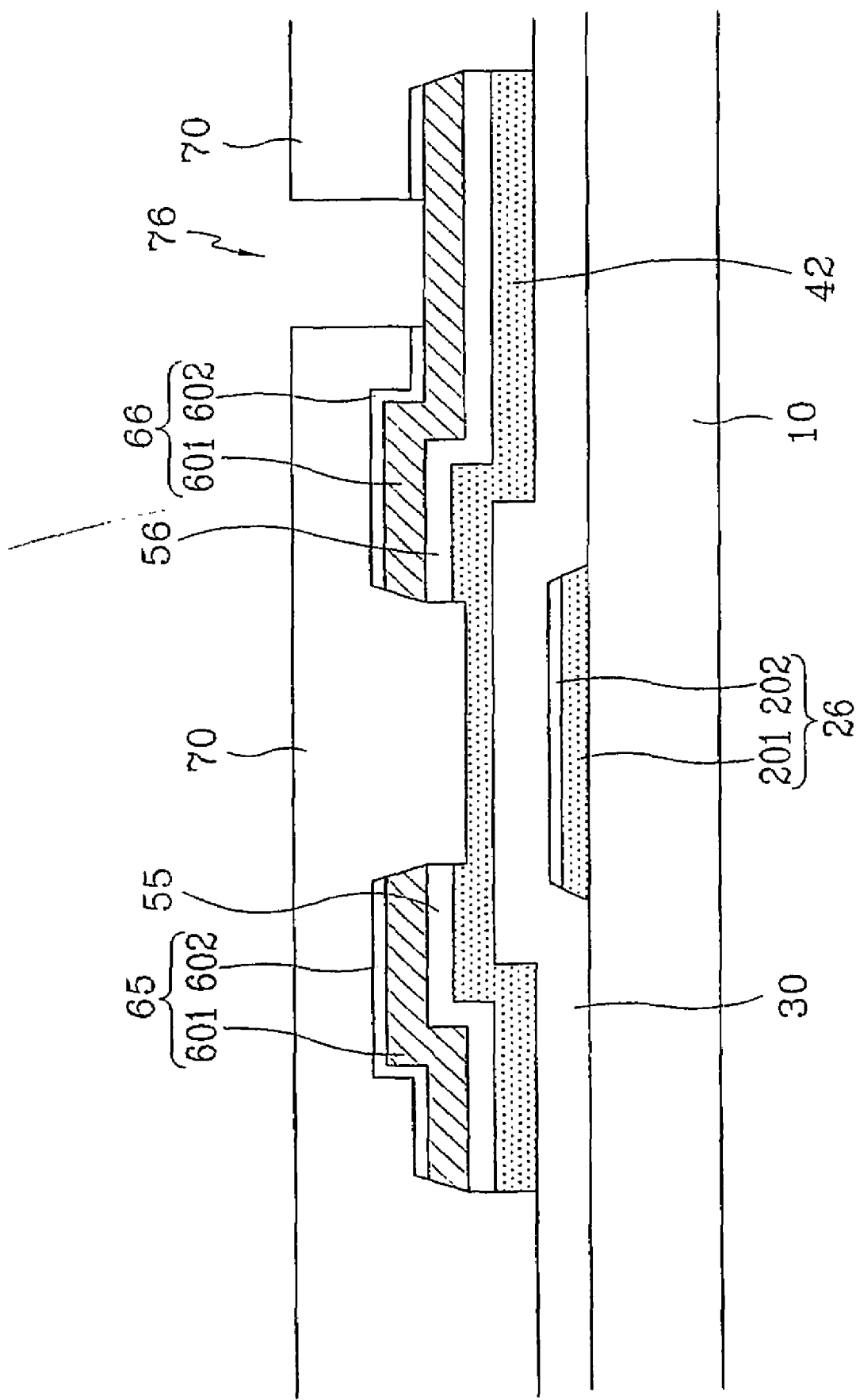

US 7,638,800 B2

WIRE FOR A DISPLAY DEVICE, A METHOD FOR MANUFACTURING THE SAME, A THIN FILM TRANSISTOR ARRAY PANEL INCLUDING THE WIRE, AND A METHOD FOR MANUFACTURING THE SAME

BACKGROUND OF THE INVENTION (a) Field of the Invention

The present invention relates to a wire for a display device and a thin film transistor array panel including the same.

(b) Description of the Related Art

A liquid crystal display ("LCD") includes an upper panel and a lower panel, and a liquid crystal material interposed therebetween. Such an LCD displays images by applying electric field using electrodes to the liquid crystal material interposed between the two panels and adjusting the strength of the electric field to control the transmittance of light passing through the panels.

One of the panels includes wires transmitting gate signals or image signals, pixel electrodes receiving the image signals, and thin film transistors ("TFTs") controlling the image signals transmitted to the pixel electrode of each pixel by the gate signals. The other panel includes color filters for implementing a variety of color displays and a black matrix for blocking light leakage between the pixels and for preventing the decrease of the contrast ratio.

However, the wide width of the black matrix established in consideration of the errors in aligning the two panels cause the aperture ratio to decrease. Accordingly, it is suggested to remove the black matrix. However, this makes the black brightness to be increased, thereby causing the reduction of the contrast ratio. Therefore, it is required to develop a technique capable of securing the high contrast ratio while simultaneously preventing the decrease of the aperture ratio.

Meanwhile, according to a typical method of manufacturing an LCD, a TFT array panel is manufactured by photo etching using masks. In this case, the number of the masks is preferably made to be smaller in order to reduce production cost.

SUMMARY OF THE INVENTION

An object of the present invention is to provide a wire for a display device a manufacturing method thereof, and a TFT array panel including a wire, and a manufacturing method thereof capable of preventing the reduction of aperture ratio and securing high contrast ratio.

Another object of the present invention is to simplify a manufacturing method of a TFT array panel.

To solve these problems, a wire for a display device according to the present invention includes a metal film and a metal oxide film formed on the metal film.

The wire for a display device may be used as a gate line or a data line of a liquid crystal display. Preferably, the metal film includes one of Cr, Mo, Mo alloy, Al and Al alloy and the metal oxide film includes one of oxides of Cr, Mo and Mo alloy. It is preferable that the conductive material included in the metal film and the conductive material included in the metal oxide film are substantially the same. The metal layer and the metal oxide layer are etched by either the same etching type or different etching types.

According to an embodiment of the present invention, when the metal film includes Cr and the metal oxide film includes CrOx, the metal film and the metal oxide film are a single wet etch using an etchant including 8-12% $Ce(NH_4)_2(NO_3)_6$, 10-20% $NH_3$ and remaining ultra pure water.

The wire for a display device and the manufacturing method thereof are used for a signal line of a liquid crystal display and a manufacturing method thereof.

In detail, a thin film transistor array panel includes a gate wire formed on an insulating substrate and including a gate line and a gate electrode connected to the gate line. A gate insulating film covering the gate wire is formed thereon. A semiconductor layer is formed on the gate insulating film, and a data wire is formed thereon. The data wire includes a data line, a source electrode connected to the data line and located on the semiconductor layer and a drain electrode formed on the semiconductor layer and located opposite the source electrode with respect to the gate electrode. A pixel electrode including a transparent conductive material or a reflective conductive material and connected to the drain electrode is formed a passivation layer covering the data wire. The gate wire or the data wire includes a metal film including a conductive material and a metal oxide film including an oxide of a conductive material.

Preferably, the gate wire further includes a gate pad connected to the gate line, the data wire further includes a data pad connected to the data line, and the thin film transistor array panel further includes a subsidiary gate pad including substantially the same layer as the pixel electrode and connected to the gate pad and a subsidiary data pad including substantially the same layer as the pixel electrode connected to the data pads.

The passivation film may include SiOC, SiOF, SiNx or an organic insulating material. The semiconductor layer may have substantially the same planar shape as the data wire excluding a channel portion between the source electrode and the drain electrode.

According to a method of manufacturing a thin film transistor array panel of an embodiment of the present invention, a gate wire or a data wire including a Cr film a CrOx film is etched by using an etchant including 8-12% $Ce(NH_4)_2(NO_3)_6$, 10-20% $NH_3$ and remaining ultra pure water to patterning the Cr film and the CrOx film.

BRIEF DESCRIPTION OF THE DRAWINGS

FIG. 7B is a sectional view of the TFT array panel shown in FIG. 7A taken along the line VIIb-VIIb' in the step following the step shown in FIG. 6B;

FIGS. 13B and 13C are sectional views of the TFT array panel shown in FIG. 13A taken along the lines XIIIb-XIIIb' and XIIIc-XIIIc', respectively;

FIGS. 15B and 15C are sectional views of the TFT array panel shown in FIG. 15A taken along the lines XVb-XVb' and XVc-XVc', respectively;

FIGS. 19B and 19C are sectional view of the TFT array panel shown in FIG. 19A taken along the lines XIXb-XIXb' and XIXc-XIXc', respectively.

DETAILED DESCRIPTION OF THE PREFERRED EMBODIMENTS

Now, wires for display devices, manufacturing methods thereof, TFT array panels including wires and manufacturing methods thereof according to embodiments of the invention will be described in detail with reference to the accompanying drawings for ordinary skill in the art to easily carry out.

Figure 1:
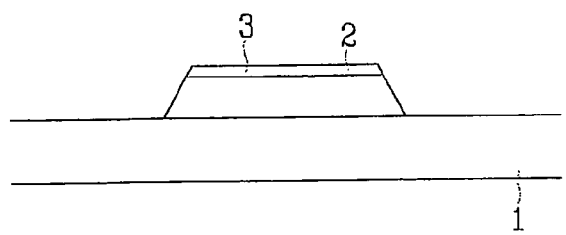
FIG. 1 is a sectional view of a wire for a display device according to an embodiment of the present invention.

FIG. 1 is a sectional view showing a structure of a wire for a display device.

As shown in FIG. 1, a wire according to an embodiment of the present invention includes a metal film 2 formed on a substrate 1 and a metal oxide film 3 on the metal film 2. The metal film 2 is made of a conductive material having low resistivity such as Cr, Mo, Mo alloy, Al, Al alloy, Ti, or Ta, and the metal oxide film 3 is made of oxide of the above-described metals such as CrOx, MoOx or oxide of Mo alloy.

The wire according to this embodiment of the present invention includes the metal film 2 made of a conductive material having low resistivity as well as the metal oxide film 3, and hence, the wire is opaque and has low reflectance. Thus, the wire according to this embodiment of the present invention serves both as a signal line for transmitting gate (scanning) signals or data signals in a display device such as an LCD and as a black matrix for blocking the light leakage between pixels. The wire with low reflectance prevents the increase of the brightness of black grays to secure high contrast ratio. This will be described in detail with reference to the drawings.

In a method of manufacturing a wire according to an embodiment of this present invention, the metal film 2 is deposited in a chamber by sputtering and oxygen gas is flowed into the chamber to form the metal oxide film 3 so that the metal film 2 and the metal oxide film 3 include the same conductive material. Alternatively, the metal film 2 and the metal oxide film 3 include different conductive materials.

Both dry etching and wet etching are used for patterning the metal film 2 and the metal oxide film 3. Alternatively, the metal film 2 and the metal oxide film 3 are patterned by different etchings.

In an embodiment of the present invention, after forming a metal film 2 by depositing Cr, CrOx is formed by flowing oxygen thereinto to form a metal oxide film 3. Next, a photosensitive film pattern for wire is formed, and the metal oxide film 3 is patterned using the photosensitive film pattern as an etching mask. The patterning of the CrOx film 3 is performed by dry etching using a gas mixture including $O_2 + Cl_2$ or $O_2 + HCl$. The Cr film 2 is patterned by wet etching using the photosensitive film pattern or the Cr oxide film 3 as an etching mask. Since the wet etching isotropically etches the target, the undercut may occur under the CrOx film 3. Therefore, it is preferable that both the CrOx film 3 and the Cr film 2 is etched by the same etching technique, i.e., either by wet etching or by dry etching to form a tapered structure.

In an experiment of the present invention, a wire including a Cr film 2 and a CrOx film 3 was patterned by wet etching using an etchant including 8-12% $Ce(NH_4)_2(NO_3)_6$, 10-20% $NH_3$ and remaining ultra pure water. As a result, the Cr film 2 and the CrOx film 3 were patterned together to form an inclination angle of about 30-50 degrees, thereby obtaining the improved wire.

In one experiment example of the present invention, a reflectance of conductive films including a CrOx film 3 and a Cr film 2 was measured.

Figure 2:
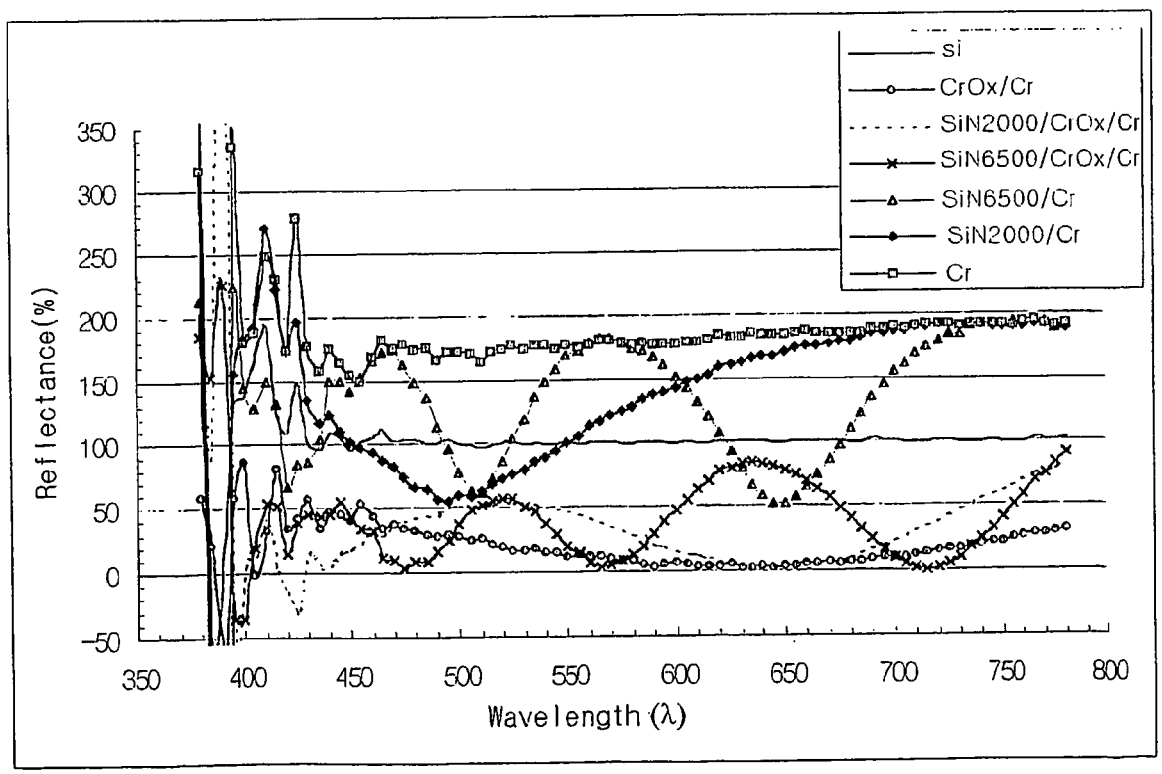
FIG. 2 is a graph showing reflectance of a variety of thin films including Cr or CrOx in an experiment of the present invention.

FIG. 2 is a graph showing reflectances of a variety of the films including Cr or CrOx.

Here, the reflectance was measured for a Si thin film (Si), a thin film (CrOx/Cr) including Cr and CrOx thereon, a thin film (SiN2000/CrOx/Cr) including Cr, CrOx and silicon nitride with 2,000 Å thickness sequentially deposited one after another, a thin film (SiN6500/CrOx/Cr) including Cr, CrOx and silicon nitride with 6,500 Å thickness sequentially deposited one after another, a thin film (SiN6500/Cr) including Cr and silicon nitride with 6,500 Å thickness thereon, a thin film (SiN2000/Cr) including Cr and silicon nitride with 2,000 Å thickness thereon and a Cr thin film (Cr). The reflectances of the thin films were calculated relative to the reflectance of the Si film (Si), which was defined to have 100% reflectance.

As shown in FIG. 2, the reflectances of the thin films including Cr and CrOx deposited on Cr were reduced very much compared with those of the Si film (Si) and the Cr film (Cr), and measured to be reduced to about 20% compared with the Si film (Si).

In another experiment of the present invention, a Cr thin film, a thin film including Cr and CrOx were photographed.

Figure 3:
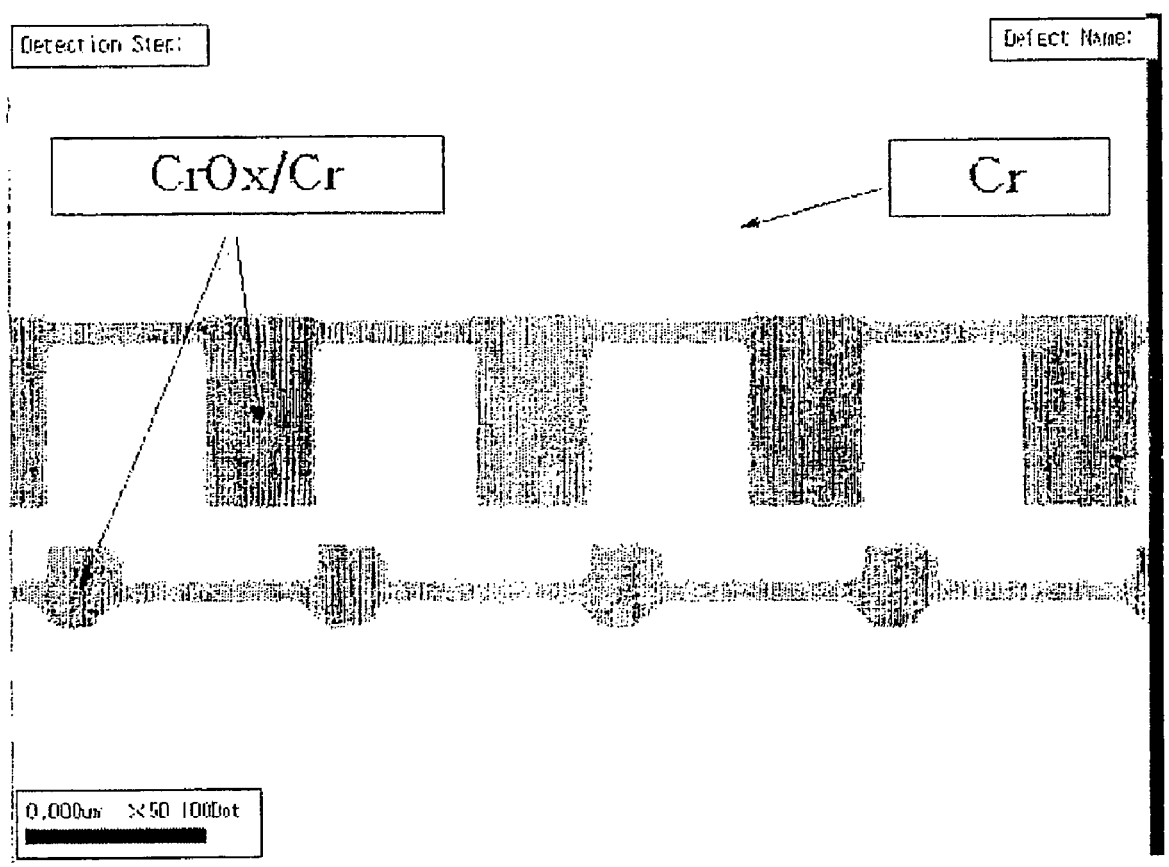
FIG. 3 is a photograph of a Cr thin film and a thin film including Cr and CrOx.

FIG. 3 is a photograph of a Cr thin film and a thin film including Cr and CrOx according to an experiment of the present invention.

As shown in FIG. 3, the Cr thin film (Cr) with high reflectance appeared bright reflectance, while the thin film (CrOx/Cr) of Cr and CrOx with very low reflectance appeared dark. It can be seen that the thin film (CrOx/Cr) of Cr and CrOx has so low reflectance that a light blocking film of the thin film (CrOx/Cr) does not increase the black brightness, thereby securing light contrast ratio.

Now, LCDs including TFT array panels with wires and manufacturing methods thereof according to embodiments of the present invention will be described in detail with reference to the drawings.

First, a structure of an LCD according to a first embodiment of the present invention will be described in detail with reference to FIGS. 4 and 5.

Figure 4:
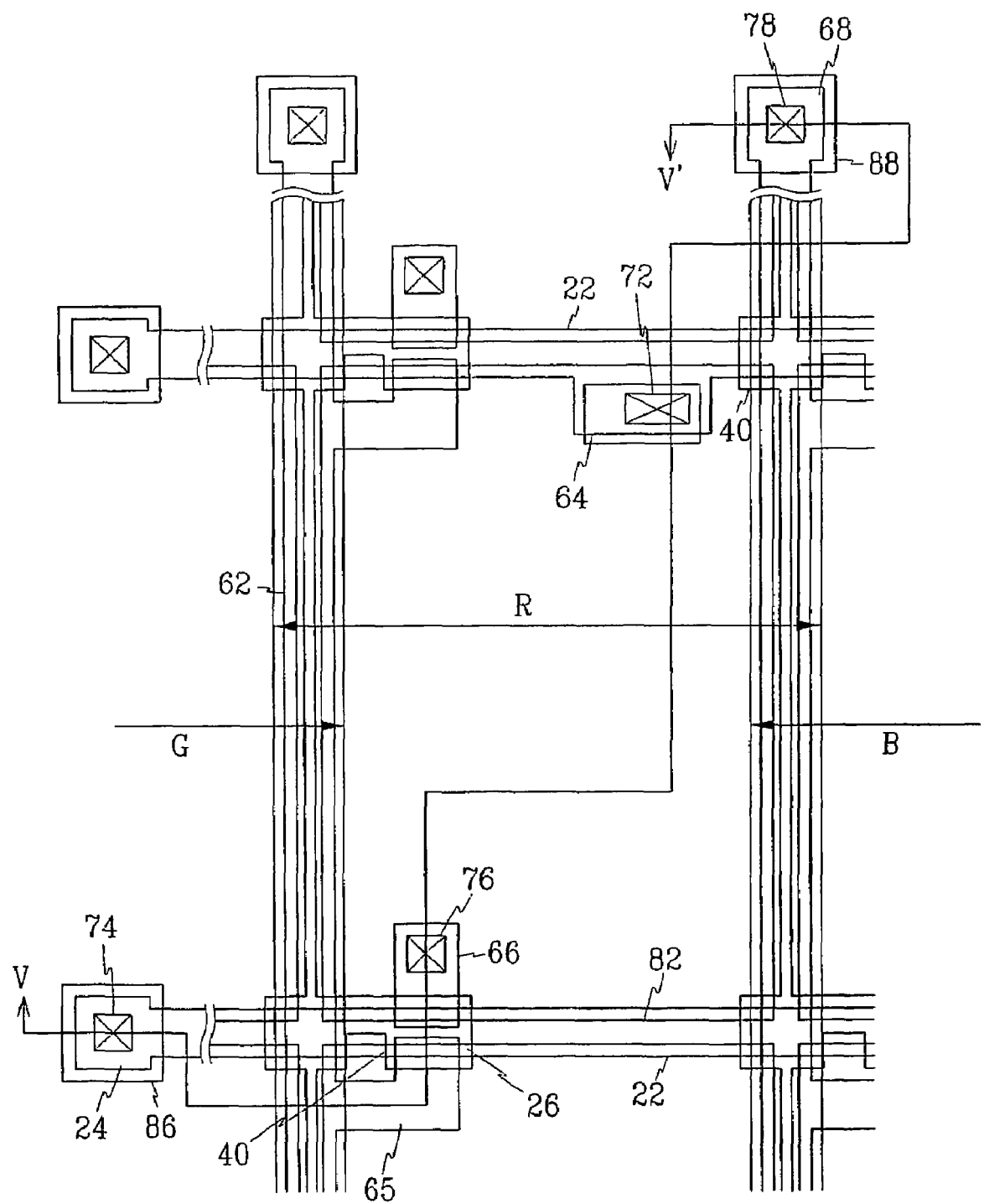
FIG. 4 shows a TFT array panel for an LCD according to a first embodiment of the present invention.
Figure 5:
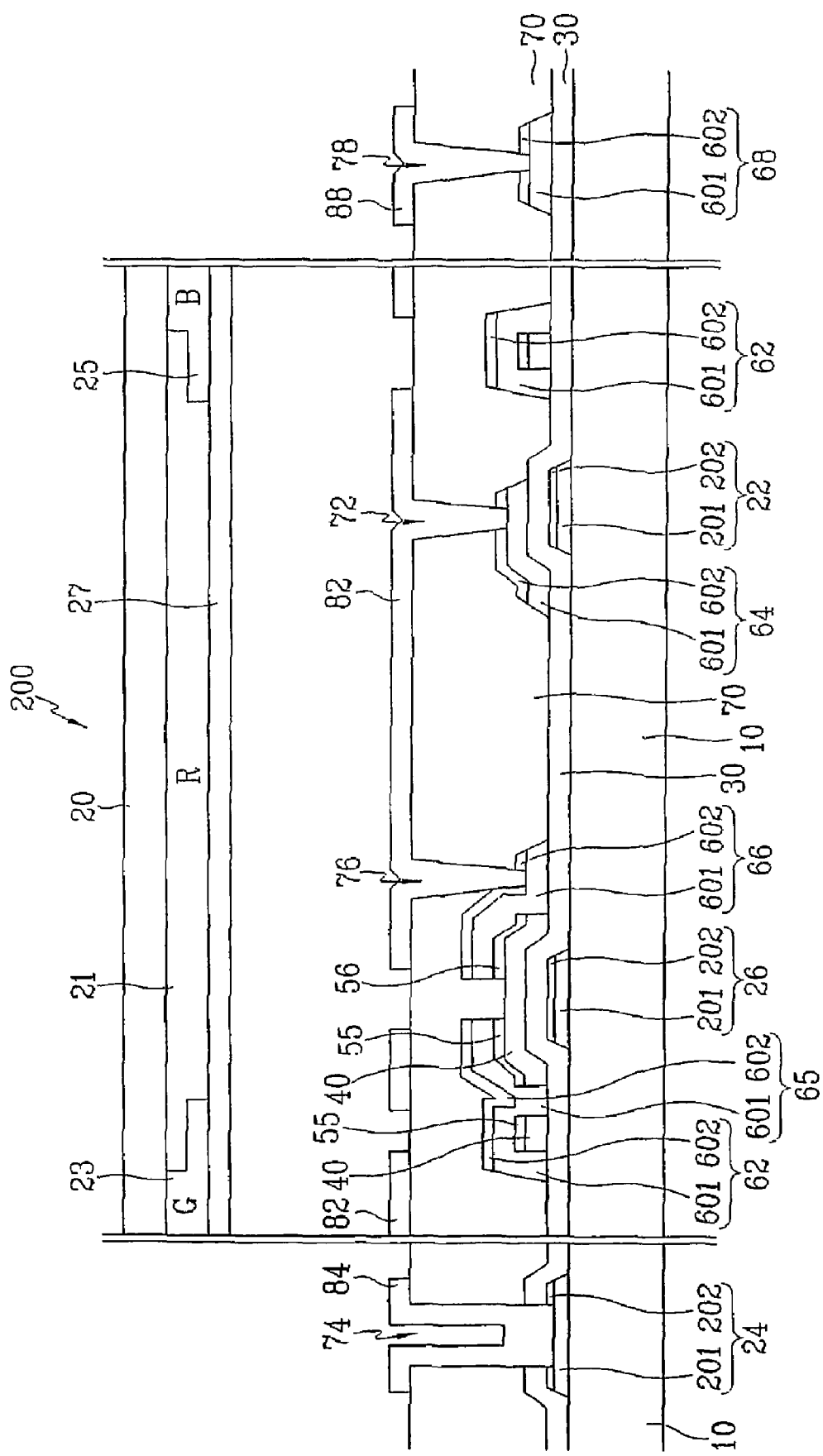
FIG. 5 is a sectional view of the TFT array panel shown in FIG. 4 taken along the line III-III'.

FIG. 4 is a layout view of an LCD according to a first embodiment of the present invention, and FIG. 5 is a sectional view of the LCD shown in FIG. 4 taken along the line IV-IV'.

Regarding a lower panel 100, a gate wire is formed on a lower insulating substrate 10. The gate wire includes a metal film 201 made of a conductive material having low resistivity such as Cr, Mo, Mo alloy, Al, Al alloy and a metal oxide film 202 preferably made of CrOx, MoOx or oxide of Mo alloy. The gate wire includes a plurality of gate lines 22 extending in a transverse direction, a plurality of gate pads 24 connected to one ends of the gate lines 22 to transmit gate signals from an external device to the gate lines 22, and a plurality of gate electrodes 26 of TFT's connected to the gate lines 22. The gate wire 22, 24 and 26 have a finely-tapered structure with an inclination angle of 30-50 degrees to give fine profiles of other layers formed later.

A gate insulating film 30 preferably made of SiNx on the substrate 10 covers the gate wire 22, 24 and 26.

A semiconductor layer 40 preferably made of amorphous silicon is formed on the gate insulating film 30 opposite the gate electrodes 24. An ohmic contact layer 55 and 56 preferably made of silicide or n+ hydrogenated amorphous silicon heavily doped with n type impurities is formed on the semiconductor layer 40.

A data wire is formed on the ohmic contact layer 55 and 56 and the gate insulating film 30. The data wire includes a metal film 601 made of a conductive material such as Cr, Mo, Mo alloy, Al, Al alloy like the gate wire 22, 24 and 26 and a metal oxide film 602 formed on the metal film 601 and preferably made of CrOx, MoOx or oxide of Mo alloy.

The data wire includes a plurality of data lines 62 extending in a longitudinal direction and intersecting the gate lines 22 to form a plurality of pixels, a plurality of source electrodes 65 branched from the data lines 62 and extending onto a portion 55 of the ohmic contact layer, a plurality of data pads 68 connected to one ends of the data lines 62 to receive image signals from an external device, and a plurality of drain electrodes 66 formed on the other portion of the ohmic contact layer, located opposite the source electrodes 65 with respect to the gate electrodes 26 and separated from the source electrodes 65. The data wire further includes a plurality of storage capacitor conductors 64 overlapping the gate lines 22 to secure storage capacitance.

A passivation layer 70 is formed on the data wire 62, 64, 65, 66 and 68 and portions of the semiconductor layer 40 which are not covered with the data wire 62, 65, 66 and 68. The passivation layer 70 preferably includes organic material having low dielectric constant, low-dielectric insulating material such as SiOC SiOF deposited by chemical vapor deposition ("CVD") and having a dielectric constant equal to or less than four or SiNx.

The passivation layer 70 is provided with a plurality of contact holes 72, 76 and 78 respectively exposing the storage capacitor conductors 64, the drain electrodes 66 and the data pads 68, and the passivation layer 70 and the gate insulating film 30 has a plurality of contact holes 74 exposing the gate pads 24.

A plurality of pixel electrodes 82 are formed on the passivation layer 70 and located in the pixel areas. The pixel electrodes 82 are electrically connected to the storage capacitor conductors 64 and the drain electrodes 66 through the contact holes 72 and 76, respectively. Furthermore, a plurality of subsidiary gate pads 86 and a plurality of subsidiary data pads 88 are formed on the passivation layer 70. The subsidiary gate pads 86 and the subsidiary data pads 88 are connected to the gate pads 24 and the data pads 68 through the contact holes 74 and 78, respectively. The pixel electrodes 82, the subsidiary gate pads 86 and the subsidiary data pads 88 are preferably formed of transparent conductive material such as indium tin oxide ("ITO") or indium zinc oxide ("IZO") or reflective conductive material such as Al, Al ally, Ag and Ag alloy.

A TFT array panel according to this embodiment of the present invention with transparent conductive pixel electrodes is used for a transmissive LCD displaying images using a light source, while a TFT array panel with reflective conductive pixel electrodes with conductive pixel electrodes is used for a reflective LCD displaying images using natural light or an external light. Alternatively, a TFT array panel with reflective conductive pixel electrodes with conductive pixel electrodes is used for a transflective LCD.

As shown in FIG. 4 and FIG. 5, the pixel electrodes 82 overlap the gate lines 22 to form a plurality of storage capacitors. In case the storage capacity is not sufficient, a storage capacitor wire formed of the same layer as the gate wire 22, 24 and 26 may be added. In addition, the transparent conductors 82, 86 and 88 may be located either under the passivation layer 70 or under the data wire 62, 64, 65, 66 and 68.

In the TFT array panel for an LCD according to the first embodiment of this present invention, since the gate lines 22 and the data lines 62 defining the pixel areas include the metal films 201 and 601 and the metal oxide films 202 and 602 having low reflectance and blocking light-leakage between the neighboring pixel areas, the gate lines 22 and the data lines 62 are displayed in dark colors to decrease the black brightness, thereby securing high contrast ratio.

The LCD according to the first embodiment of the present invention includes an upper panel 200 disposed opposite to the lower panel 100. Regarding the lower panel 200, a plurality of red, green and blue color filters R, G and B having shapes of straight lines are sequentially arranged on a lower insulating substrate 20. The portions red, green and blue color filters R, G and B located between the neighboring pixel areas have smaller thickness than the other portions thereof and overlap each other. The thickness of edge portions of each of the red, green and blue color filters R, G and B is about a half of that of central portion. However, the thickness ratio may be different depending on the process conditions. The thickness of the overlapping portions equal to that of the central portion is preferred for smoothing the layers of the color filters R, G and B as a whole for planarization of the panel to improve the step coverage of subsequent films and to prevent the arrangement of the liquid crystal molecules from being out of order. In addition, the overlapping portions of two edge portions of the neighboring color filters R, G and B, which are displayed in dark colors owing to the mixture of two colors, can block the light leakage through these portions as a light-blocking layer as well as increasing contrast ratio of black and white.

A common electrode 29 is formed on the color filters R, G and B to evenly cover the color filters R, G and B.

Although not shown in drawings, a liquid crystal layer is interposed between the upper panel 200 and the lower panel 100.

In the LCD according to this embodiment of the present invention, the gate lines 22,. the data lines 62 of the lower panel 100 and the color filters R, G and B can block the light leakage between the pixel areas and are displayed in dark colors so that a separate black matrix need not be provided on the color filter panel, thereby securing both aperture ratio of the pixel and high contrast ratio.

Now, a method of manufacturing a TFT array panel for an LCD according to the first embodiment of the present invention will be described in detail with reference to FIGS. 6A to 9B as well as FIGS. 4 and 5.

Figure 6A:
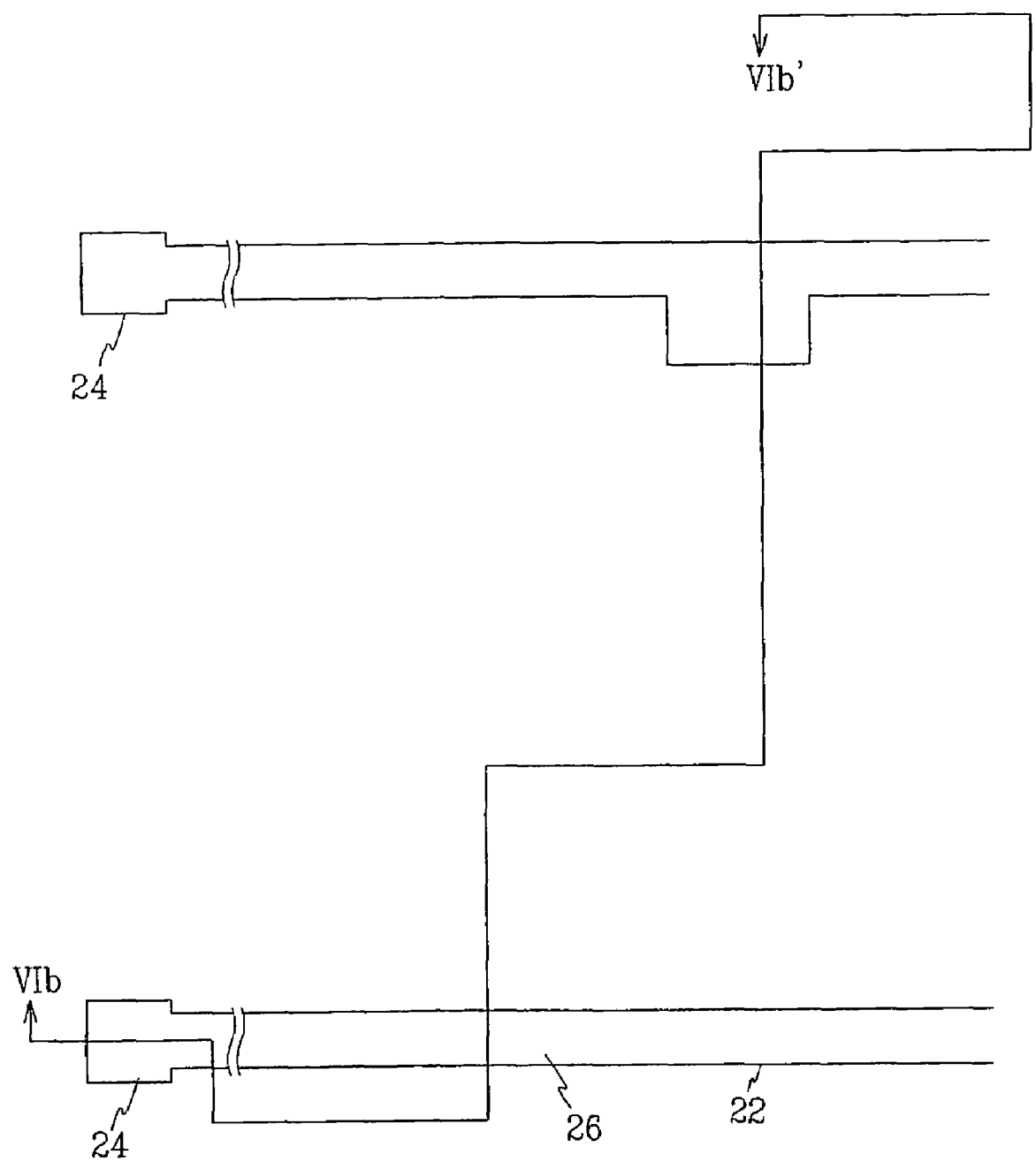
FIGS. 6A, 7A, 8A and 9A are layout views sequentially illustrating the intermediate steps of a method of manufacturing a TFT array panel for an LCD according to the first embodiment of the present invention.
Figure 6B:
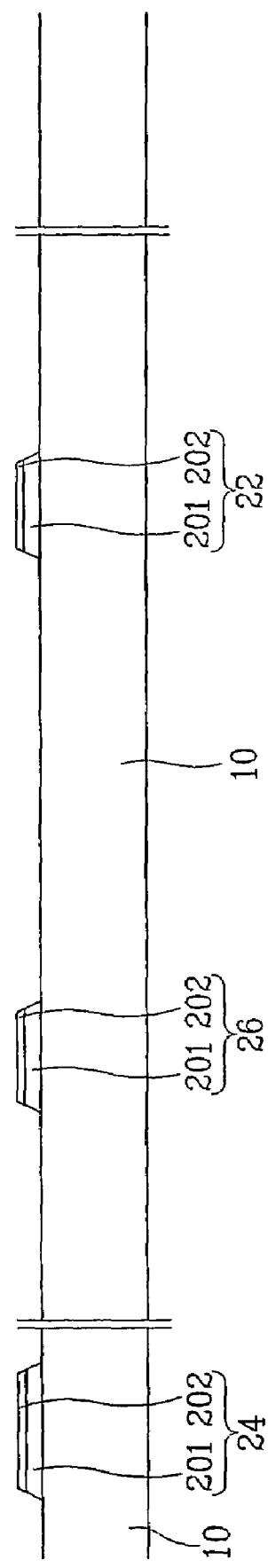
FIG. 6B is a sectional view of the TFT array panel shown in FIG. 6A taken along the line VIb-VIb'.

First, as shown in FIG. 6A and FIG. 6B, after a 2,500 Å thick metal film 201 is deposited by sputtering using one of Cr, Mo, and Mo alloy, oxygen (or $CO_2$) is introduced into a sputtering chamber to form a 500 Å thick metal oxide film 202 with deposition. The metal oxide film 202 and the metal film 201 are patterned to form a gate wire including a plurality of gate lines 22, a plurality of gate electrodes 26 and a plurality of gate pads 24.

In the embodiment of the present invention, when the metal film 201 and the metal oxide film 202 include Cr, the CrOx film 202 is patterned by dry etching using a gas mixture including $O_2+Cl_2$ or $O_2+HCl$ and the Cr film 201 is patterned by wet etching. Since the wet etching isotropically etches the target, portions of the Cr film 201 under the CrOx film 3 may be undercut to cause poor profiles of other layers formed later. Therefore, it is preferable that both the CrOx film 202 and the Cr film 201 is etched by the same etching technique, i.e., either by wet etching or by dry etching to form a tapered structure. In this embodiment of the present invention, the Cr film 201 and the CrOx film 202 are patterned by wet etching using an etchant including 8-12% $Ce(NH_4)_2(NO_3)_6$, 10-20% $NH_3$ and remaining ultra pure water to obtain a wire structure with an inclination angle of about 30-50 degrees. The simultaneous etching of the Cr film 201 and the CrOx film 202 simplifies the manufacturing process and the tapered structure gives fine profiles of other layers formed later.

Figure 7A:
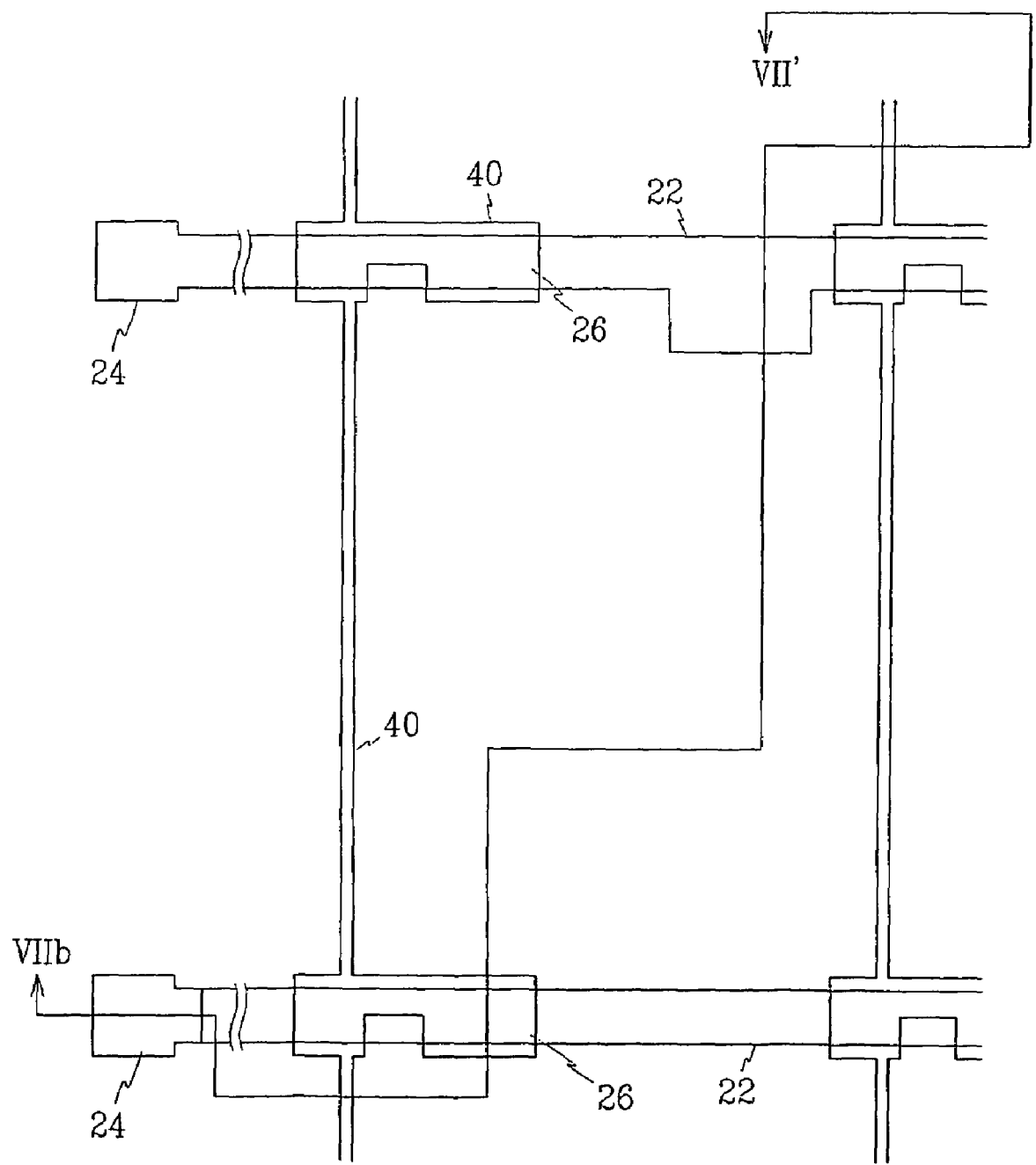

Next, as shown in FIGS. 7A and 7B, triple layers including a gate insulating film 30 preferably made of silicon nitride, a semiconductor layer preferably made of amorphous silicon, and a doped amorphous silicon layer are sequentially deposited on the substrate 10. The doped amorphous silicon layer and the semiconductor layer are patterned by a mask to form a doped amorphous silicon layer pattern 50 and a semiconductor pattern 40 on the gate insulating film 30 opposite the gate electrodes 24.

Figure 8A:
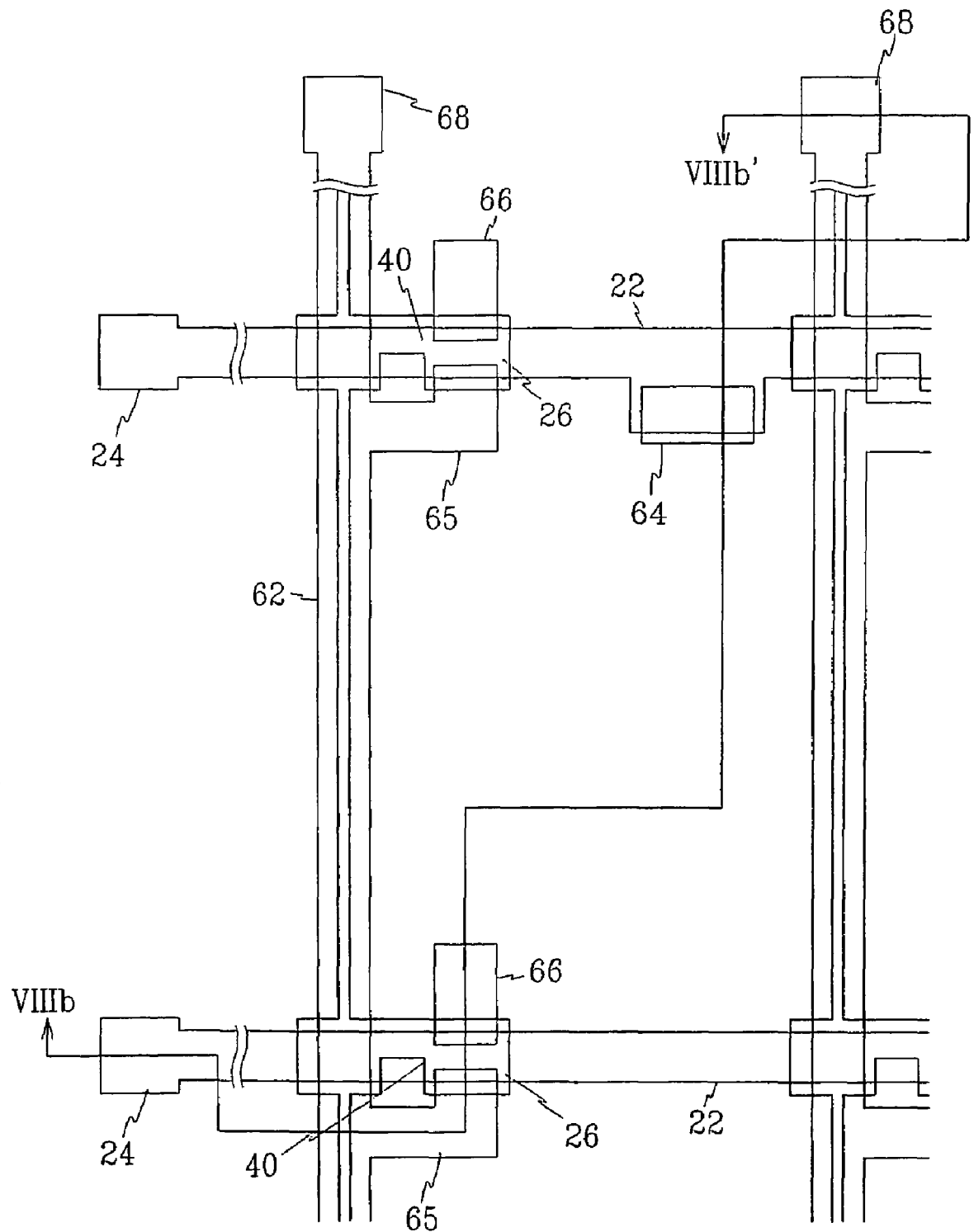
Figure 8B:
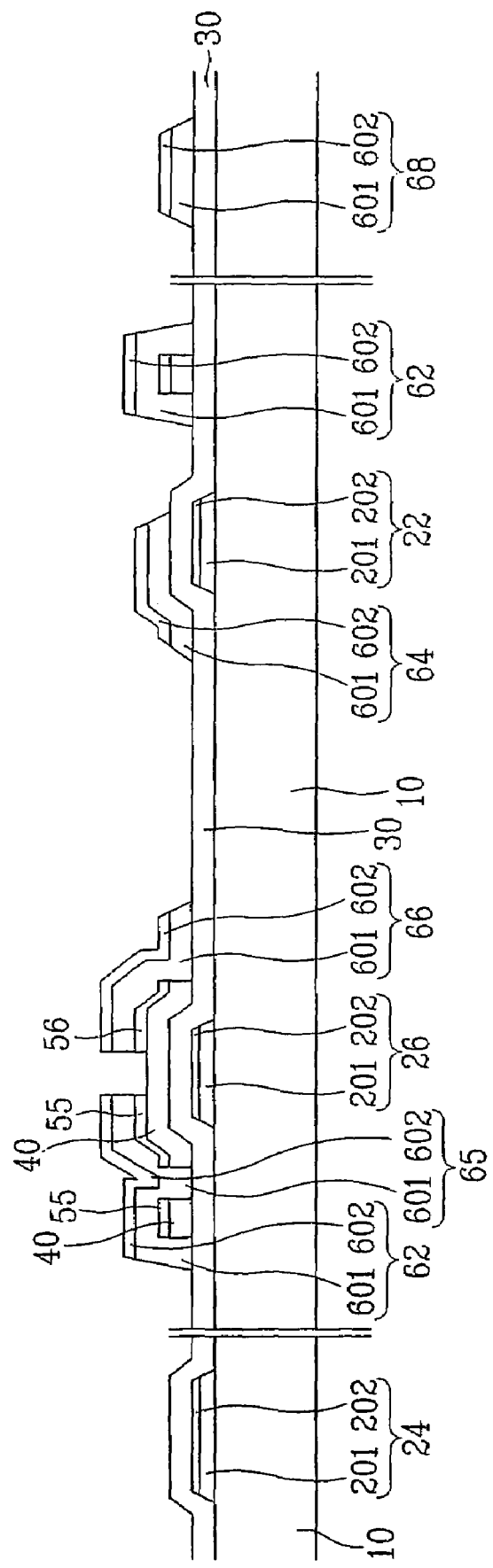
FIG. 8B is a sectional view of the TFT array panel shown in FIG. 8A taken along the line VIIIb-VIIIb' in the step following the step shown in FIG. 7B.

Next, as shown in FIGS. 8A and 8B, a metal film 601 and a metal oxide film 602 are deposited in sequence, like the gate wire, and patterned by a photolithography using a mask to form a data wire. The data wire includes a plurality of data lines 62 intersecting the gate lines 22, a plurality of source electrodes 65 connected to the data lines 62 and extending onto the gate electrodes 26, a plurality of data pads 68 connected to one ends of the data lines 62, a plurality of drain electrodes 66 separated from the source electrodes 65 and opposite the source electrodes 65 with respect to the gate electrodes 26, and a the storage capacitor conductors 64 overlapping the gate lines 22. When the data wire 62, 64, 65, 66 and 68 includes a Cr film 201 and a CrOx film 202, the Cr film 2 and the CrOx film 3 are patterned by wet etching using an etchant including 8-12% $Ce(NH_4)_2(NO_3)_6$, 10-20% $NH_3$ and remaining ultra pure water.

Then, portions of the doped amorphous silicon layer pattern 50, which are not covered by the data wire 62, 64, 65, 66 and 68, are removed such that an ohmic contact layer 55 and 56 including a plurality of pairs of two separated portions with respect to the gate electrodes 26 is formed and portions of the semiconductor layer 40 between the separated portions of the ohmic contact layer 55 and 56 are exposed. 20 In order to stabilize the exposed surface of the semiconductor layer 40, oxygen plasma treatment is preferably performed.

Figure 9A:
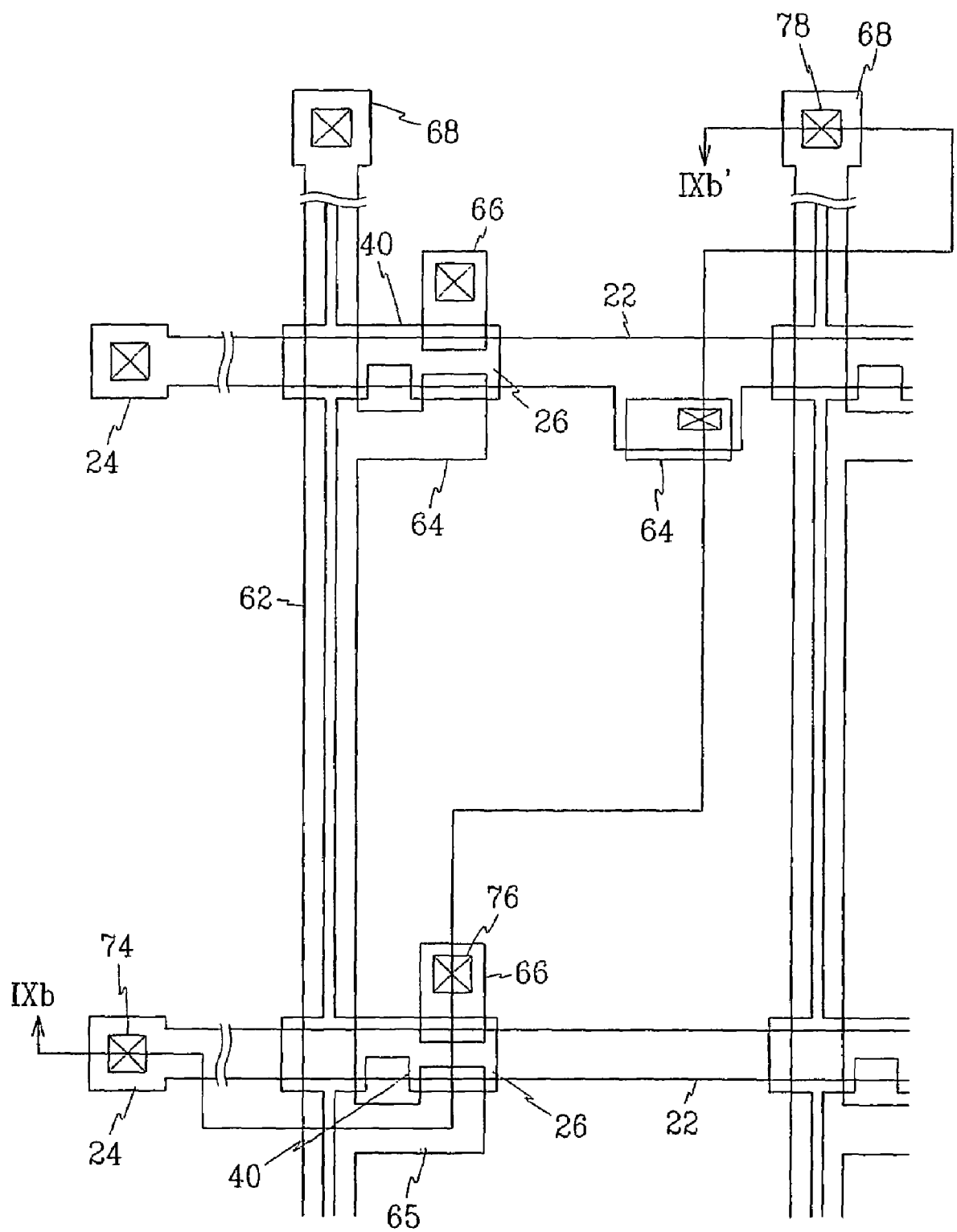
Figure 9B:
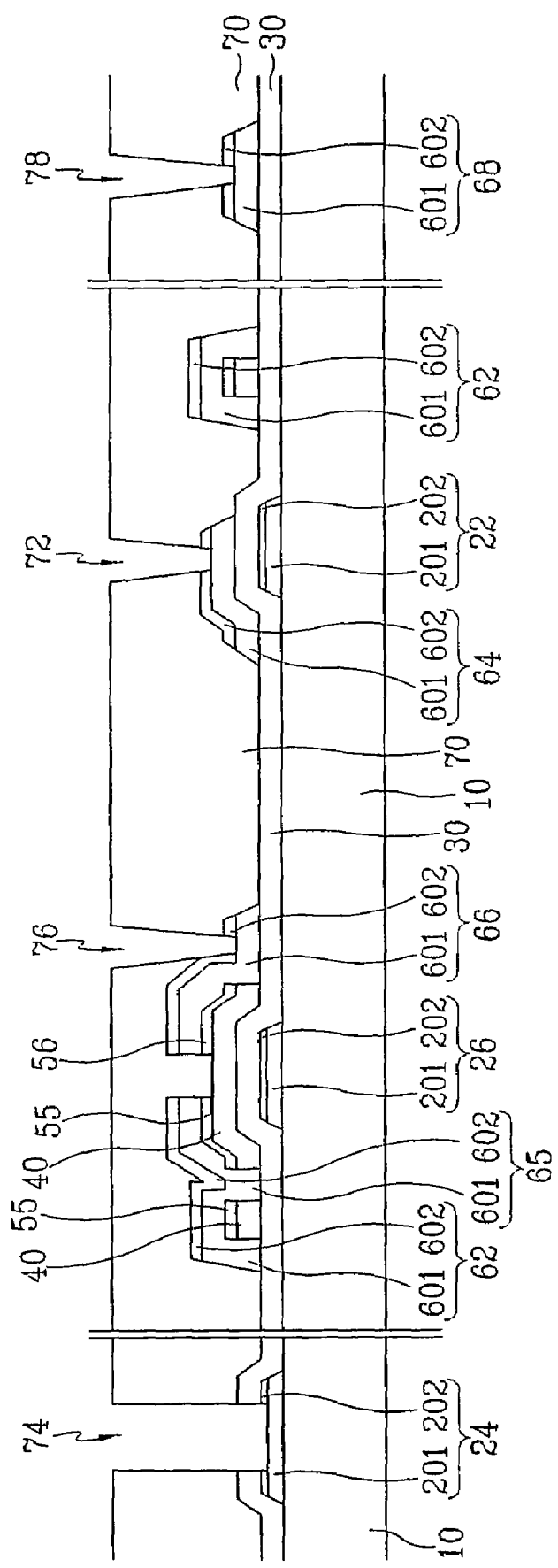
FIG. 9B is a sectional view of the TFT array panel shown in FIG. 9A taken along the line IXb-IXb' in the step following the step shown in FIG. 8B.

As shown in FIGS. 9A and 9B, a passivation layer 70 is formed try CVD of inorganic material such as silicon nitride, SiOC or SiOF having low dielectric constant, or by coating acrylic organic insulating material.

he passivation layer 70 together with the gate insulating film 30 is photo-etched using a mask to form a plurality of contact holes 72, 74, 76 and 78 exposing the storage capacitor conductors 64, the gate pads 24, the drain electrodes 66 and the data pads 68.

Finally, as shown in FIGS. 4 and 5, ITO, IZO or reflective conductive material is deposited and photo-etched using a mask to form a plurality of pixel electrodes 82, a plurality of subsidiary gate pads 86 and a plurality of subsidiary data pads 88. The pixel electrodes 82 are connected to the storage capacitor conductors 64 and the drain electrodes 66 through the contact holes 72 and 76, respectively. The subsidiary gate pads 86 and the subsidiary data pads S8 are connected to the gate pads 24 and the data pads 68 through the contact holes 74 and 78, respectively.

Although this method uses five masks as described above, the present invention is also applicable to a manufacturing method of a TFT array panel for an LCD using four masks. This will be described in detail with reference to the drawings.

Since this structure of a color filter panel is substantially the same as that of the first embodiment, the description thereof is omitted and only a TFT array panel for an LCD will be described now.

Figure 10:
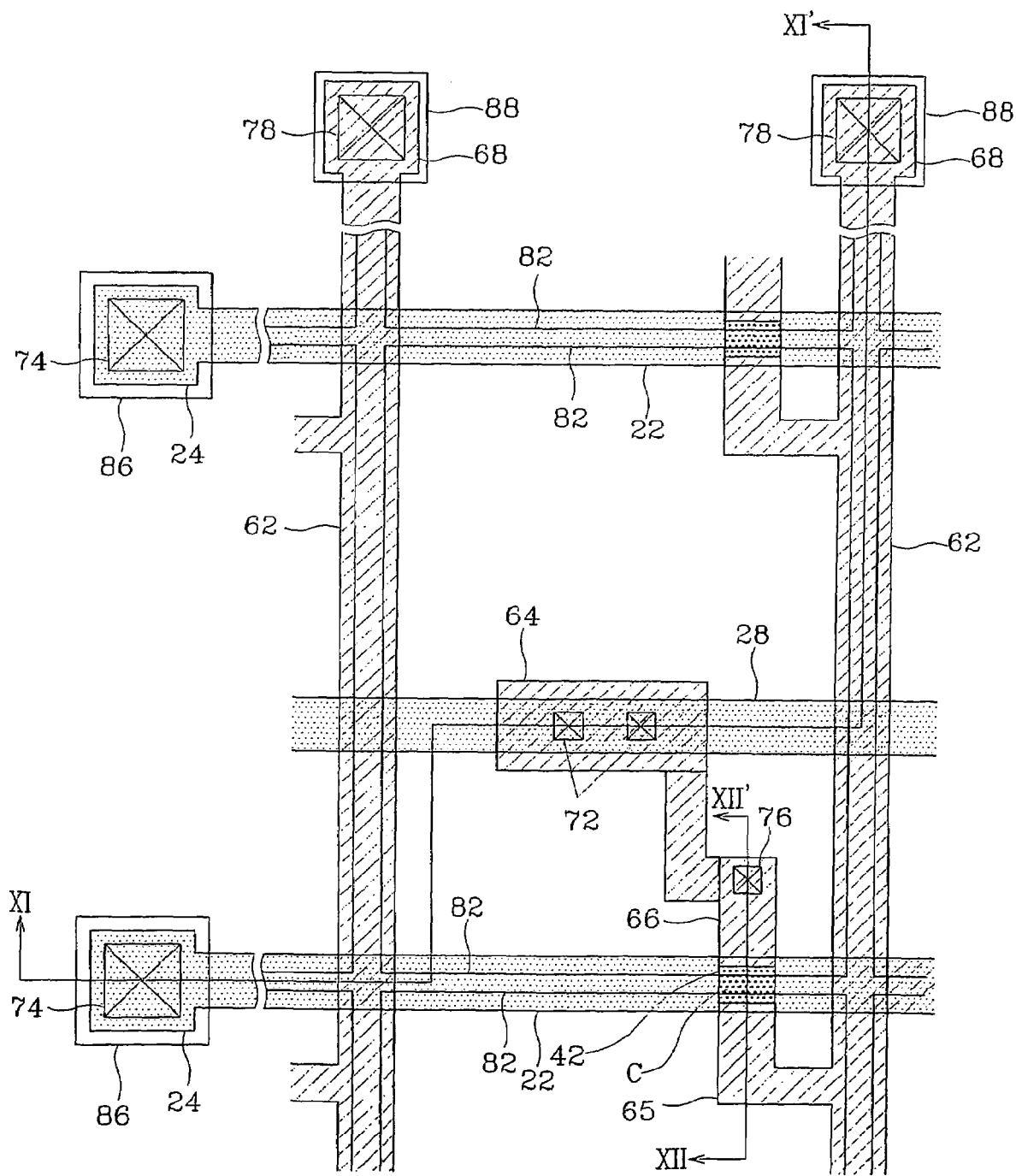
FIG. 10 is a layout view of a TFT array panel for an LCD according to a second embodiment of the present invention.
Figure 11:
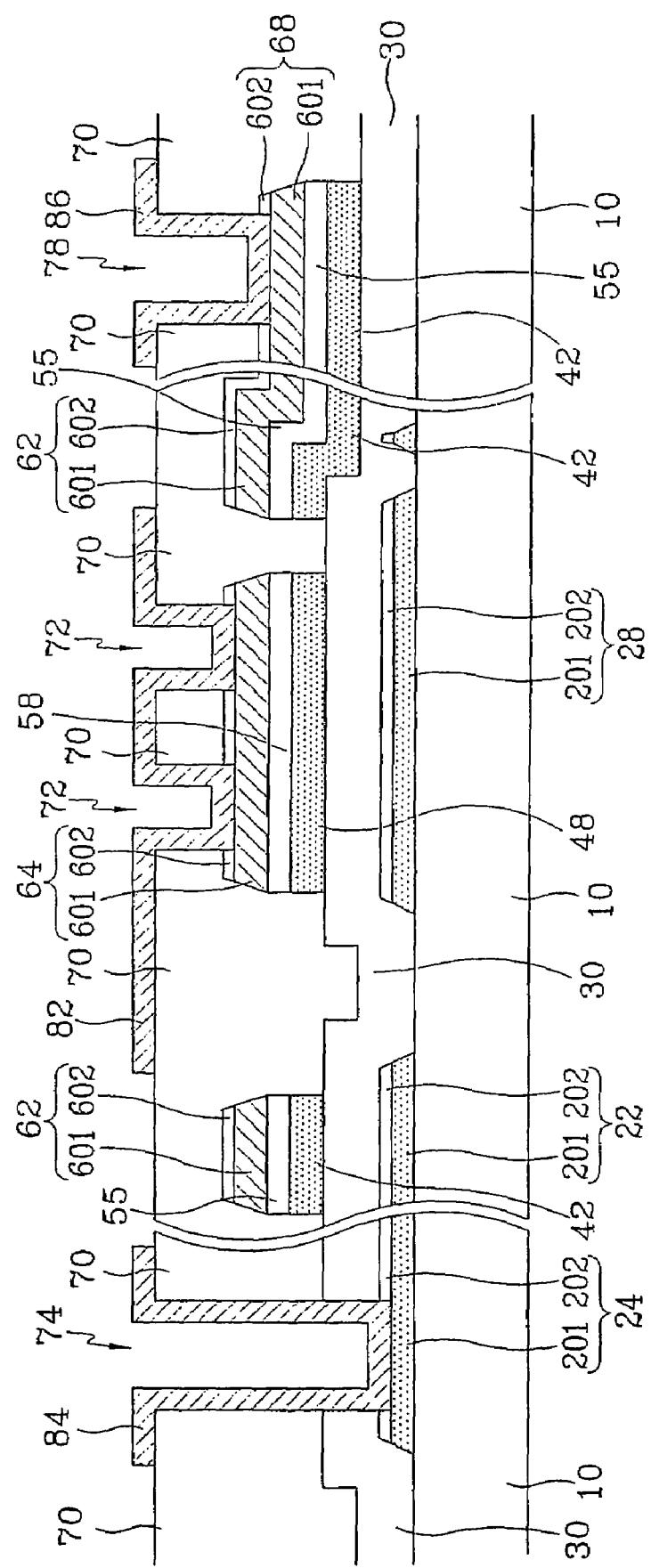
FIGS. 11 and 12 are sectional views of the TFT array panel shown in FIG. 10 taken along the lines XI-XI' and XII-XII', respectively.
Figure 12:
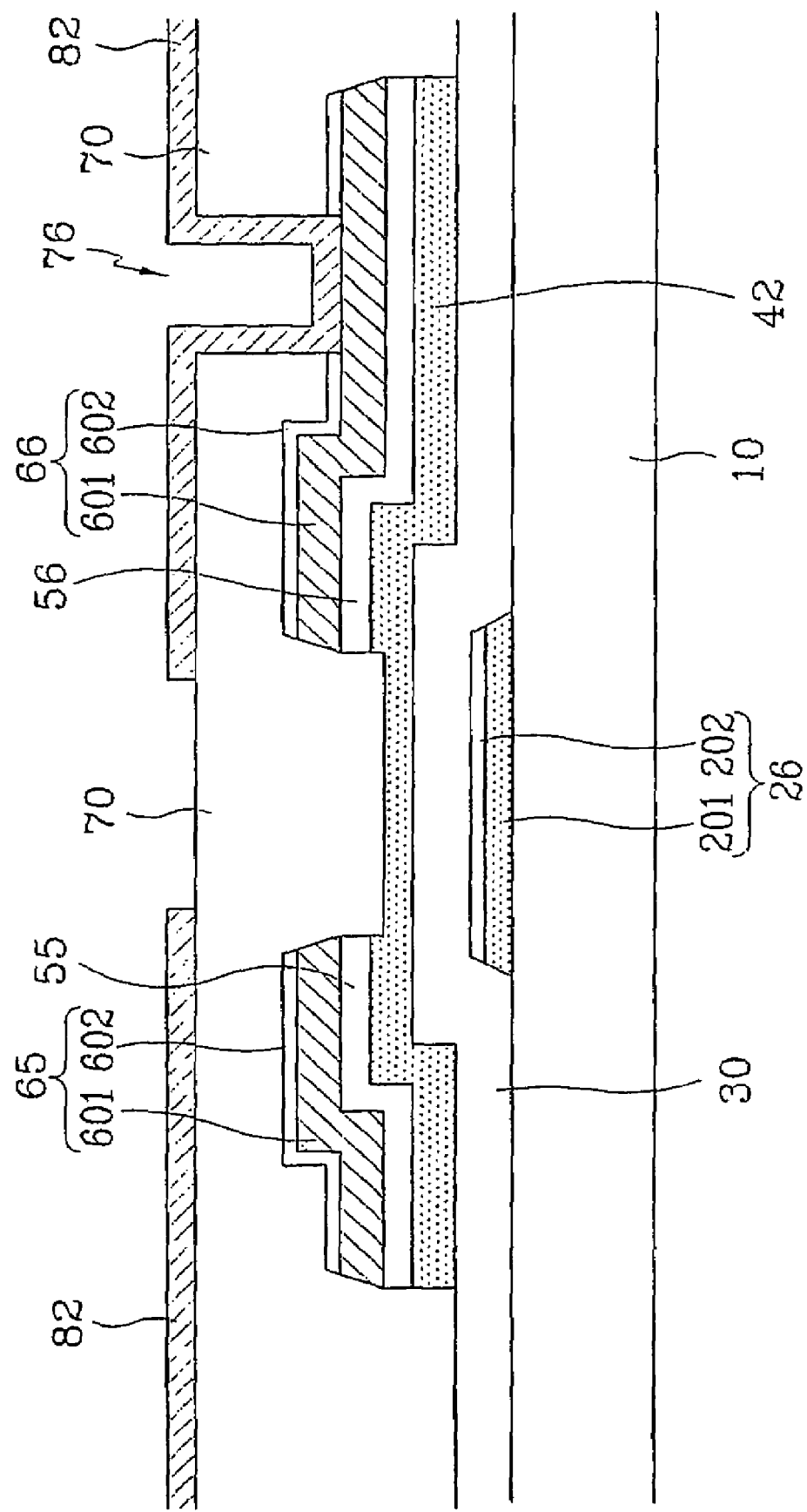

First, a structure of a pixel unit on a TFT array panel for an LCD manufactured using four masks according to an embodiment of the present invention with reference to FIGS. 10 to 12.

FIG. 10 is a layout view of a TFT array panel for an LCD according to a second embodiment of the present invention, and FIGS. 11 and 12 are sectional views of the TFT array panel shown in FIGS. 10 taken along the lines XI-XI' and XII-XII', respectively.

A gate wire is formed on an insulating substrate 10. Like the first embodiment, the gate wire includes a metal film 201 and a metal oxide film 202. The gate wire includes a plurality of gate lines 22, a plurality of gate pads 24, and a plurality of gate electrodes 26. The gate wire also includes a plurality of storage electrodes 28 parallel to the gate lines 22 on the substrate 10. The storage electrodes 28 are applied with a predetermined voltage such as a common electrode voltage which is inputted to a common electrode of an upper panel from an external device. The storage electrodes 28 overlap storage capacitor conductors 64 connected to pixel electrodes 82 to form storage capacitors for enhancing the charge storing capacity of the pixels, which is described later. In case the overlapping of the pixel electrodes 82 and the gate lines 22 gives sufficient storage capacitance, the storage electrodes 28 may be omitted.

A gate insulating film 30 preferably made of SiNx is formed on the gate wire 22, 24, 26 and 28 to cover the gate wire 22, 24, 26 and 28.

A semiconductor pattern 42 and 48 preferably made of hydrogenated amorphous silicon are formed on the gate insulating film 30. An ohmic contact pattern (or an intermediate layer pattern) 55, 56 and 58 preferably made of amorphous silicon heavily doped with n type impurities such as phosphorous P are formed on the semiconductor pattern 42 and 48.

A data wire preferably made of Mo or Mo alloy is formed on the ohmic contact pattern 55, 56 and 58. The data wire includes a plurality of data line units 62, 65 and 68, a plurality of drain electrodes 66 for TFTs, and a plurality of storage capacitor conductors 64. Each data line unit 62, 65 and 68 includes a data line 62 extending in the longitudinal direction, a data pad 68 connected to one end of the data line 62 to receive image signals from an external device, and a plurality of source electrodes 65 of TFTs branched from the data line 62. Each drain electrode 66 is separated from the data line units 62, 65 and 68 and placed opposite to the corresponding source electrode 65 with respect to the corresponding gate electrode 26 or the channel portion C of the TFT. The storage capacitor conductors 64 are placed over the storage electrodes 28. In the absence of the storage electrodes 28, the storage capacitor conductors 64 are also omitted. The data wire 62, 64, 65, 66 and 68 includes a metal film 601 and a metal oxide film 602 like the first embodiment The ohmic contact pattern 55, 56 and 58 reduces the contact resistance between the underlying semiconductor pattern 42 and 48 and the overlying data wire 62, 64, 65, 66 and 68 and has substantially the same shape as the data wire 62, 64, 65, 66 and 68. That is, the ohmic contact pattern 55, 56 and 58 includes a plurality of data-line ohmic contacts 55 having substantially the same shapes as the data line units 62, 68 and 65, a plurality of drain-electrode ohmic contacts 56 having substantially the same shapes as the drain electrodes 66, and a plurality of storage-capacitor ohmic contacts 58 having substantially the same shapes as the storage capacitor conductors 64.

Meanwhile, the semiconductor pattern 42 and 48 has substantially the same shape as the data wire 62, 64, 65, 66 and 68 and the ohmic contact pattern 55, 56 and 58 except for the TFT channel areas C. Specifically, the semiconductor pattern 42 and 48 includes a plurality of storage-capacitor semiconductors 48 having substantially the same shapes as the storage capacitor conductors 64 and the storage-capacitor ohmic contacts 58 and a plurality of TFT semiconductors 42 which have little different shapes from the remains of the data wire and the ohmic contact pattern. That is, the source and the drain electrodes 65 and 66 are separated from each other at the TFT channel areas C, where the data-line ohmic contacts 55 and the drain-electrode ohmic contacts 56 are also separated from each other. However, the TFT semiconductors 42 continue to proceed there without disconnection to form TFT channels.

A passivation layer 70 is formed on the data wire 62, 64, 65, 66 and 68. The passivation layer 70 preferably includes SiNx, SiOC, SiOF or photosensitive organic insulating material.

The passivation layer 70 has a plurality of contact holes 76, 78 and 72 exposing the drain electrodes 66, the data pads 68 and the storage capacitor conductors 64. The passivation layer 70 together with the gate insulating film 30 is further provided with a plurality of contact holes 74 exposing the gate pads 24.

A plurality of pixel electrodes 82 receiving image signals from the TFTs and generating electric fields in cooperation with an electrode of an upper panel are formed on the passivation layer 70. The pixel electrodes 82 are formed of a transparent conductive material such as IZO. The pixel electrodes 82 are physically and electrically connected to the drain electrodes 66 through the contact holes 76 to receive the image signals. The pixel electrodes 82 overlap the neighboring gate lines 22 and the adjacent data lines 62 to enlarge the aperture ratio, but the overlapping may be omitted. The pixel electrodes 82 are also connected to the storage capacitor conductors 64 through the contact holes 72 to transmit the image signals to the conductors 64.

Meanwhile, a plurality of subsidiary gate pads 86 and a plurality of subsidiary data pads 88 are formed on the gate pads 24 and the data pads 68 to be connected thereto through the contact holes 74 and 78, respectively. The subsidiary gate pads 86 and the subsidiary data pads 88 compensate the adhesiveness of the pads 24 and 68 to external circuit devices and protect the pads 24 and 68. The subsidiary gate pads 86 and the subsidiary data pads S8 are not requisites but may be introduced in a selective manner.

The LCD according to the second embodiment of this present invention has the same features as in the first embodiment. Consequently, the gate lines 22, the data lines 62 of the lower panel 100 and the color filters R, G and B can block the light leakage between the pixel areas and are displayed in dark colors so that a separate black matrix need not be provided on the color filter panel, thereby securing both aperture ratio of the pixel and light contrast ratio.

Then, a method of manufacturing the TFT array panel for an LCD shown in FIGS. 10 to 12 using four masks will be now described in detail with reference to FIGS. 13A to 19C as well as FIG. 10 to FIG. 12.

Figure 13A:
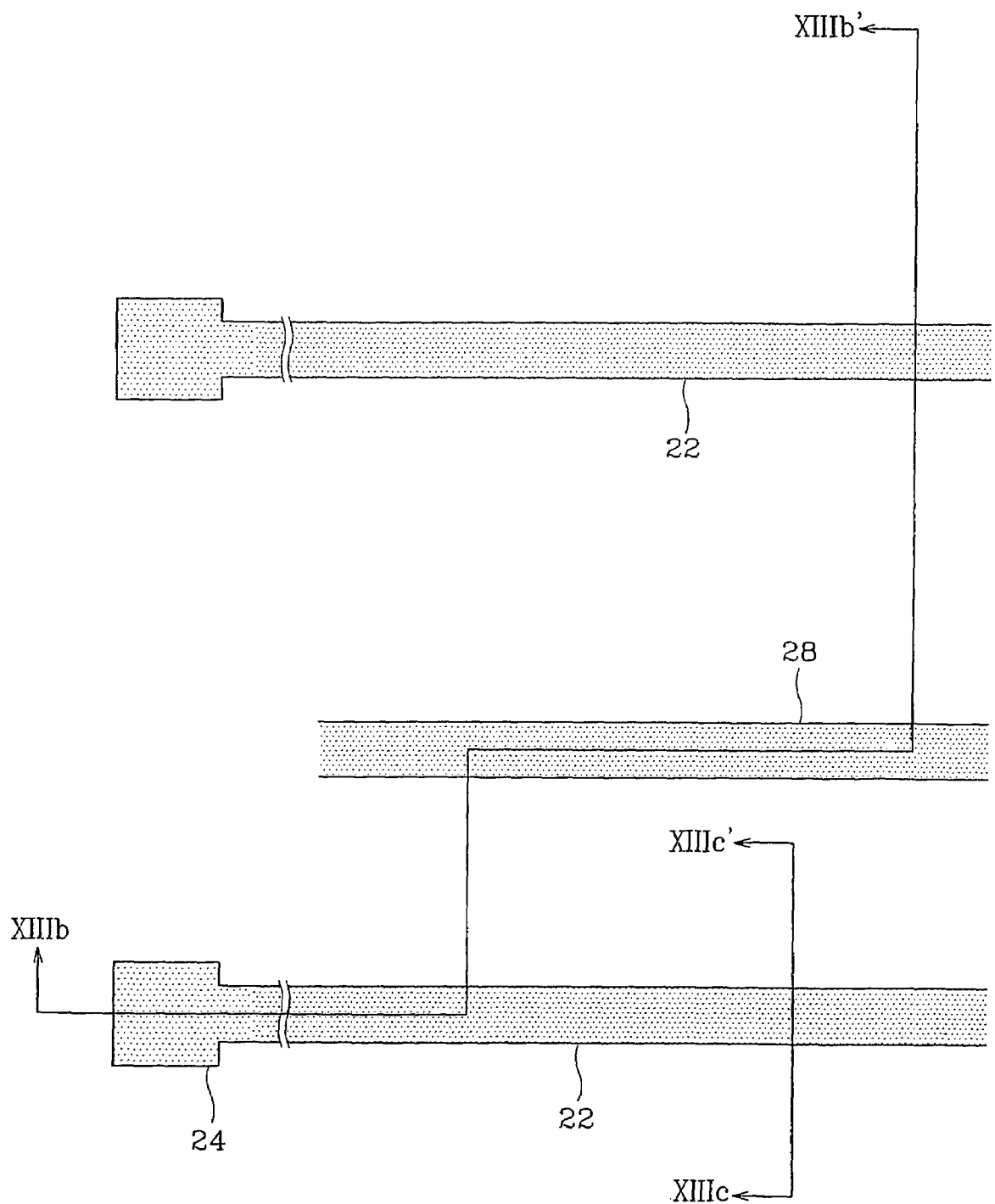
FIG. 13A is a layout view of the TFT array panel shown in FIG. 10 in the first step of a manufacturing method according to the second embodiment of the present invention.
Figure 13B:
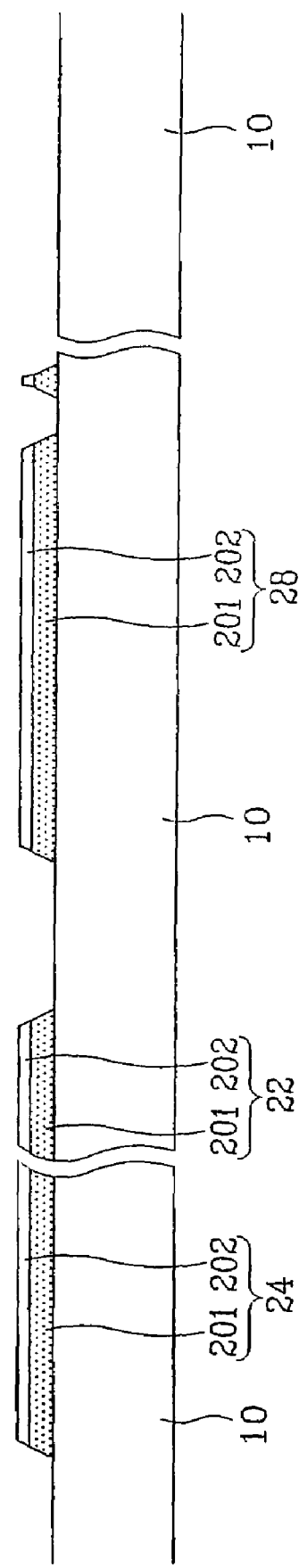

First, as shown in FIGS. 13A to 13C, a metal film 601 made of a conductive material with low resistivity and a metal oxide film 602 darkly displayed along with the metal film 601 are deposited in sequence like the first embodiment to form a gate wire including a plurality of gate lines 22, a plurality of gate electrodes 26, a plurality of gate pads 24 and a plurality of storage electrodes 28 on a substrate 10 by photo etching using a mask.

Figure 14A:
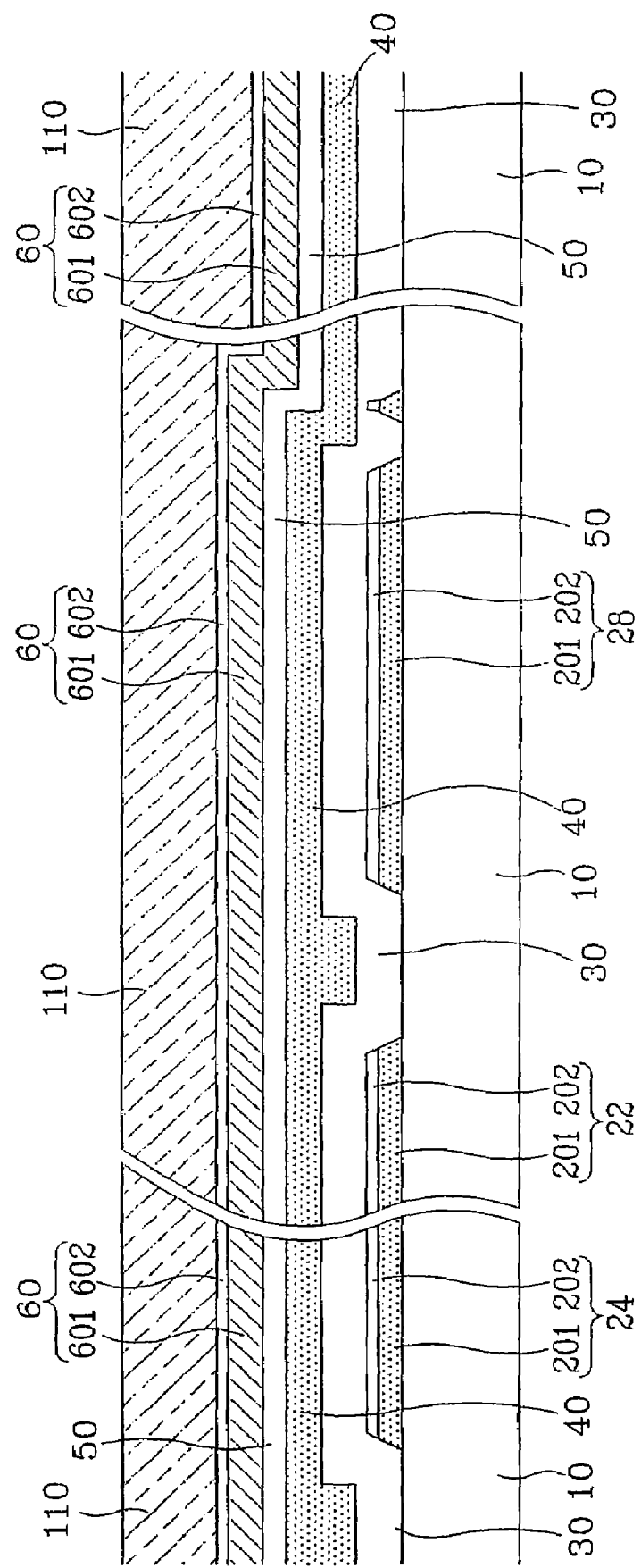
FIGS. 14A and 14B are sectional views of the TFT array panel shown in FIG. 13A taken along the lines XIIIb-XIIIb' and XIIIc-XIIIc', respectively, in the step following the step illustrated in FIGS. 13B and 13C.
Figure 14B:
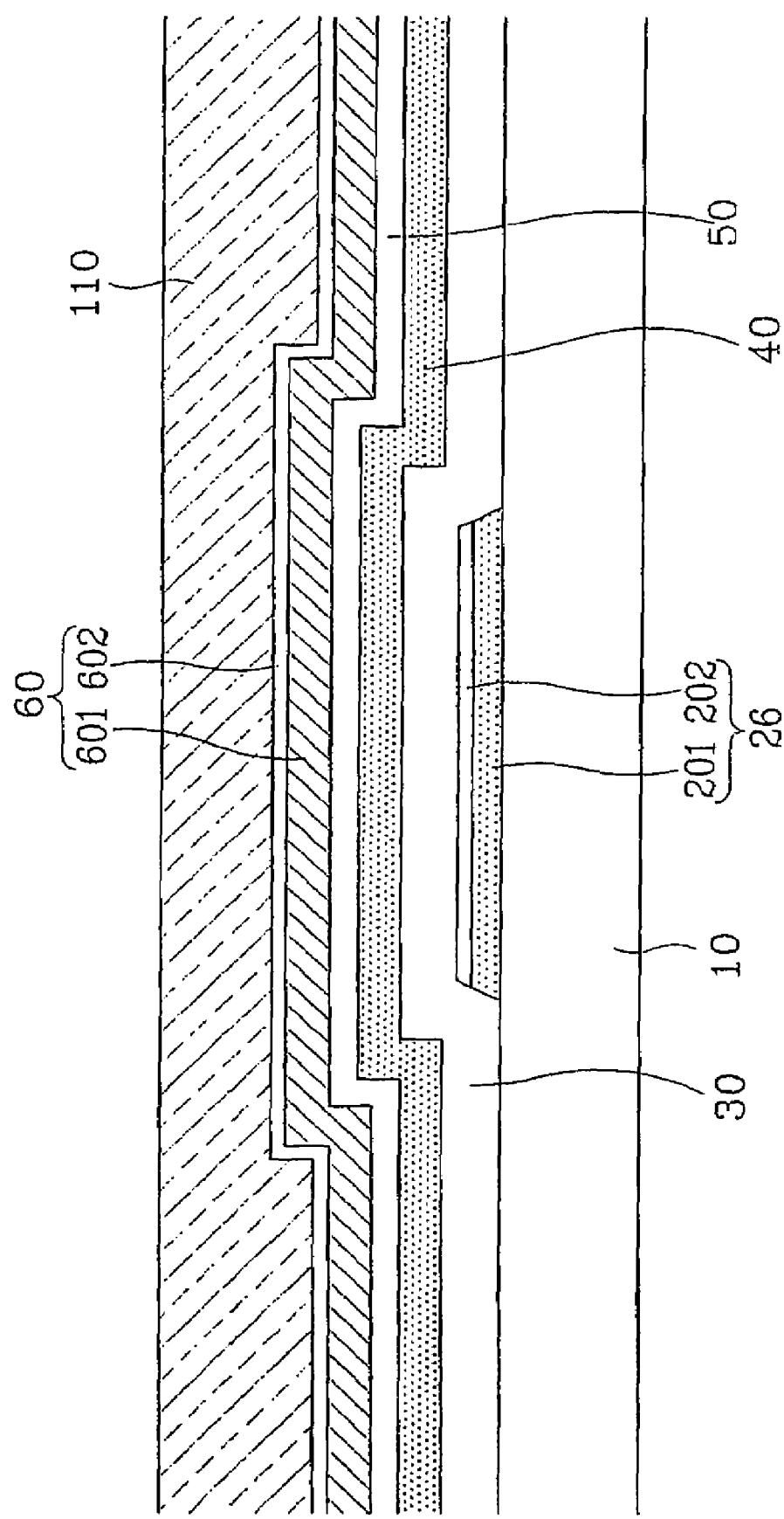
Figure 15A:
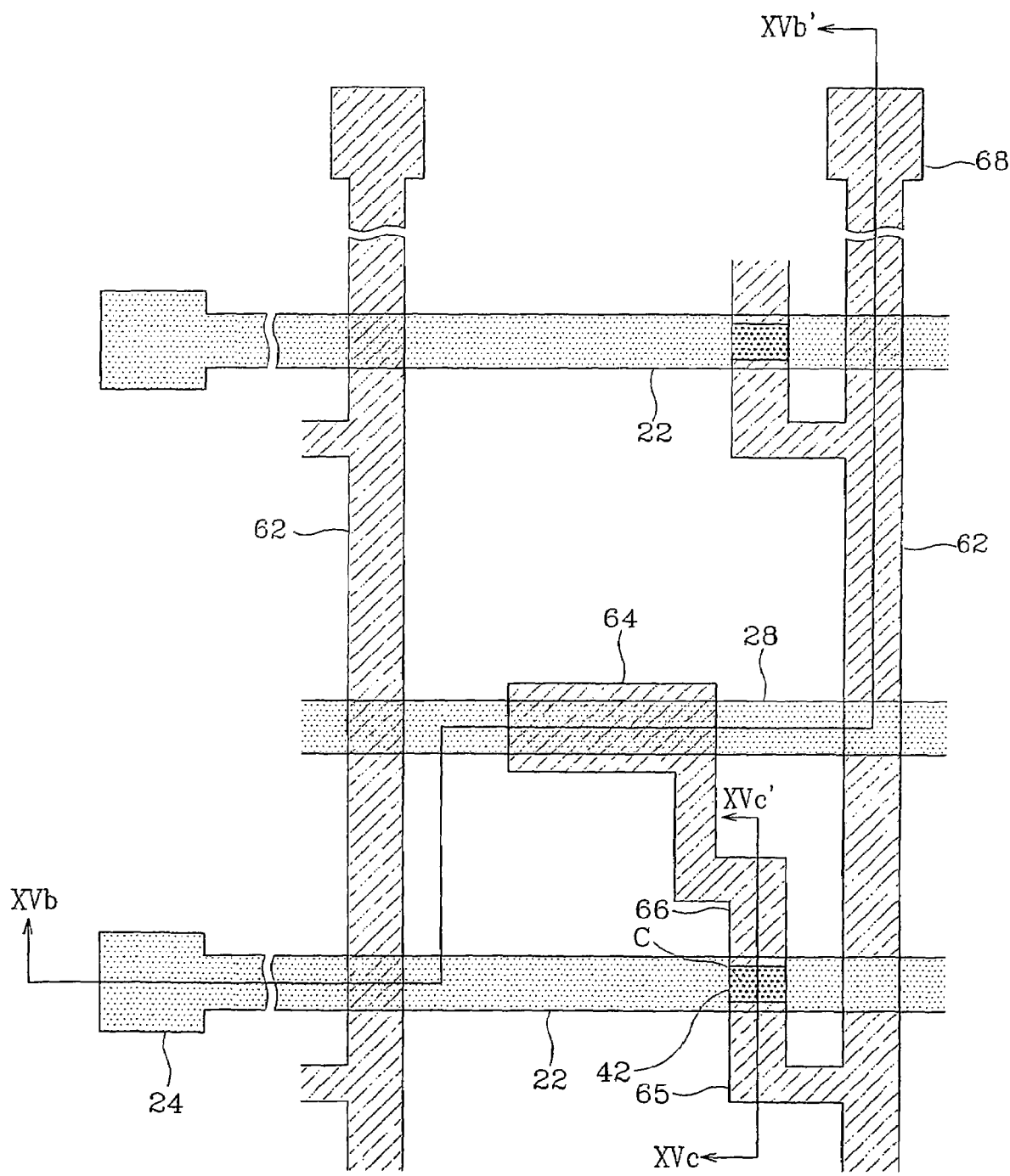
FIG. 15A is a layout view of the TFT array panel in the step following the step illustrated in FIGS. 14A and 14B.
Figure 15B:
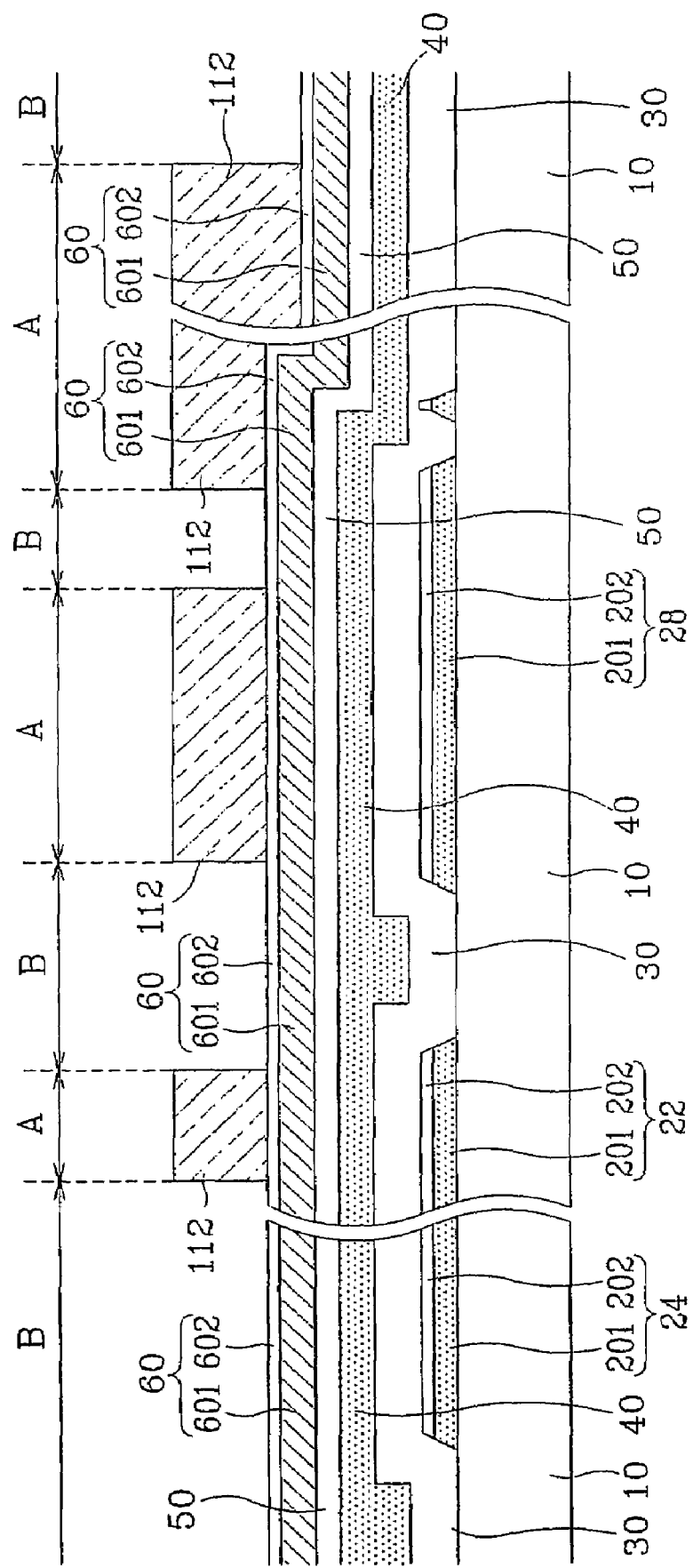

Next, as shown in FIGS. 14A and 14B, a silicon nitride gate insulating film 30 with 1,500-5,000 Å thickness, a semiconductor layer 40 with 500-2,000 Å thickness, and an intermediate layer 50 with 300-600 Å thickness are sequentially deposited on the substrate 10 by CVD. A conductive layer 60 including a metal film 601 made of conductive material having low resistivity and a metal oxide film 602 made of oxidized conductive material is deposited by such as sputtering, and a photoresist film 110 with thickness of 1-2 microns is coated thereon.

Here, base materials for the metal oxide film preferably includes oxides of almost all metals such as Cr, Al, Ag, Mo, Mo alloy, Ti, Ta . Since the thickness of the metal oxide film 602 is different depending on its reflectance, it is not easy to fix the range of the thickness. However, the thickness equal to or less than 1,500 Å is available.

Thereafter, the photoresist film 110 is exposed to light through a mask and is developed to form a photoresist pattern 112 and 114 having a plurality of first portions and a plurality of second portions as shown in FIGS. 13B and 13C. Each of the first portions 114 of the photoresist pattern 112 and 114 is located on the channel area C of a TFT, which is placed between a source electrode 65 and a drain electrode 66. Each of the second portions 112 is located on a data area A located at a place where a data wire 62, 64, 65, 66 and 68 will be formed. All portions of the photoresist film 110 on the remaining areas B are removed, and the first portions 114 are made to be thinner than the second portions 112. Here, the ratio of the thickness of the first portion 114 on the channel area C and the second portion 112 on the data area A is adjusted depending on process conditions of subsequent etching steps described later, and it is preferable that the thickness of the first portion 114 is equal to or less than a half of that of the second portion 112, for example, equal to or less than 4,000 Å.

The position-dependent thickness of the photoresist pattern 112 and 114 are obtained by several techniques. A slit pattern, a lattice pattern or a translucent film is provided on the mask in order to adjust the light transmittance in the area C.

When using a slit pattern, it is preferable that width of the slits and a gap between the slits is smaller than the resolution of an exposer used for the photolithography. In case of using a translucent film, thin films with different transmittances or different thickness may be used to adjust the transmittance on the masks.

When a photoresist film 110 is exposed to light through such a mask, polymers of a portion directly exposed to the light are almost completely decomposed, and those of a portion exposed to the light through a slit pattern or a translucent film are not completely decomposed because the amount of a light irradiation is small. The polymers of a portion of the photoresist film 110 blocked by a light-blocking film provided on the mask is hardly decomposed. After the photoresist film 110 is developed, the portions containing the polymers, which are not decomposed, is left. At this time, the thickness of the portion with less light exposure is thinner than that of the portion without light exposure. Since too long exposure time decomposes all the molecules, it is necessary to adjust the exposure time.

The first portion 114 of the photoresist pattern 112 and 114 may be obtained using reflow. That is, the photoresist film 100 is made of a reflowable material and exposed to light through a normal mask having opaque and transparent portions. The photoresist film 110 is then developed and subject to reflow such that portions of the photoresist film 110 flows down onto areas without photoresist, thereby forming the thin portion 114.

Next, the photoresist film 114 and the underlying layers including the conductive layer 60, the intermediate 50 and the semiconductor layer 40 are etched such that the data wire and the underlying layers are left on the data areas A, only the semiconductor layer is left on the channel areas C, and all the three layers 60, 50 and 40 are removed to expose the gate insulating film 30 on the remaining areas B.

Figure 16A:
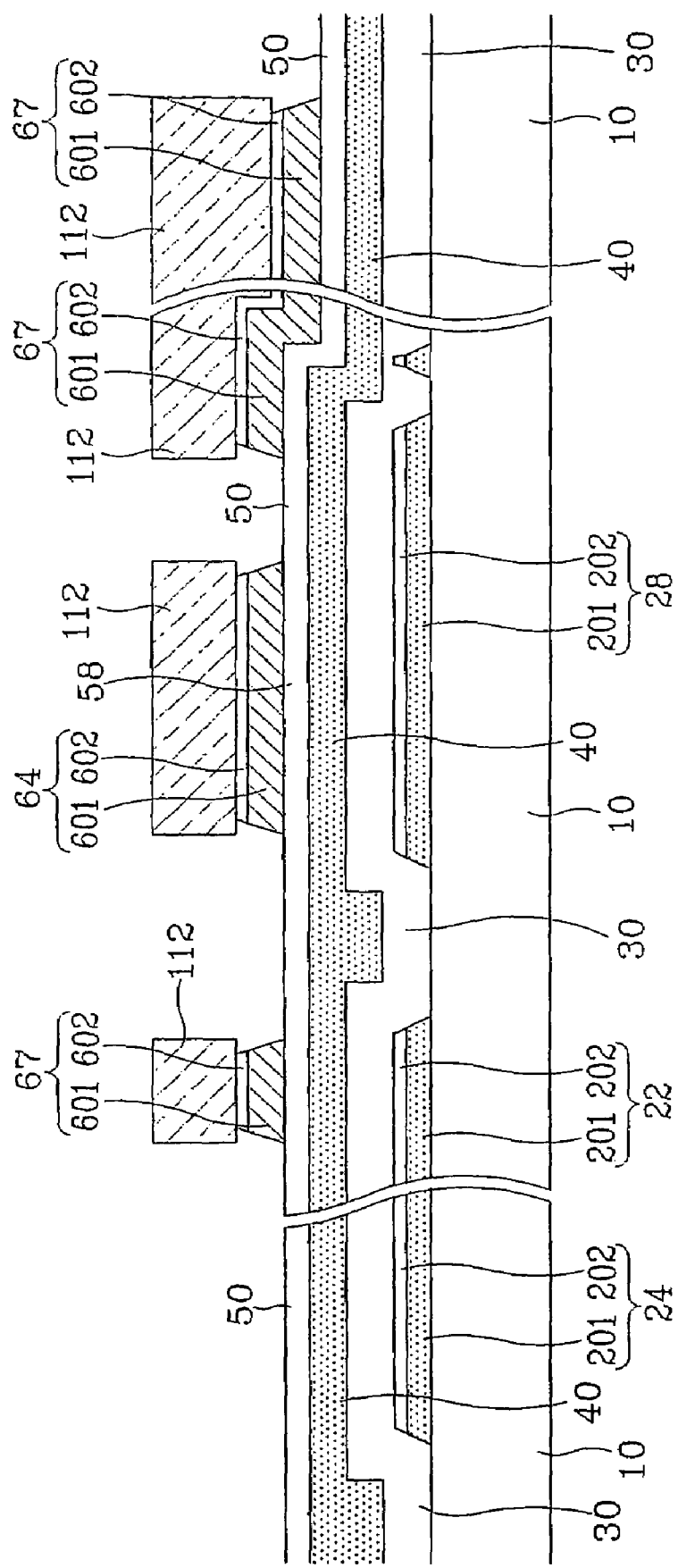
FIGS. 16A, 17A and 18A and FIGS. 16B, 17B and 18B are sectional views of the TFT array panel shown in FIG. 15A taken along the lines XIIb-XIIb' and XIIc-XIIc', respectively, sequentially illustrating the steps following the step illustrated in FIGS. 15B and 15C.
Figure 16B:
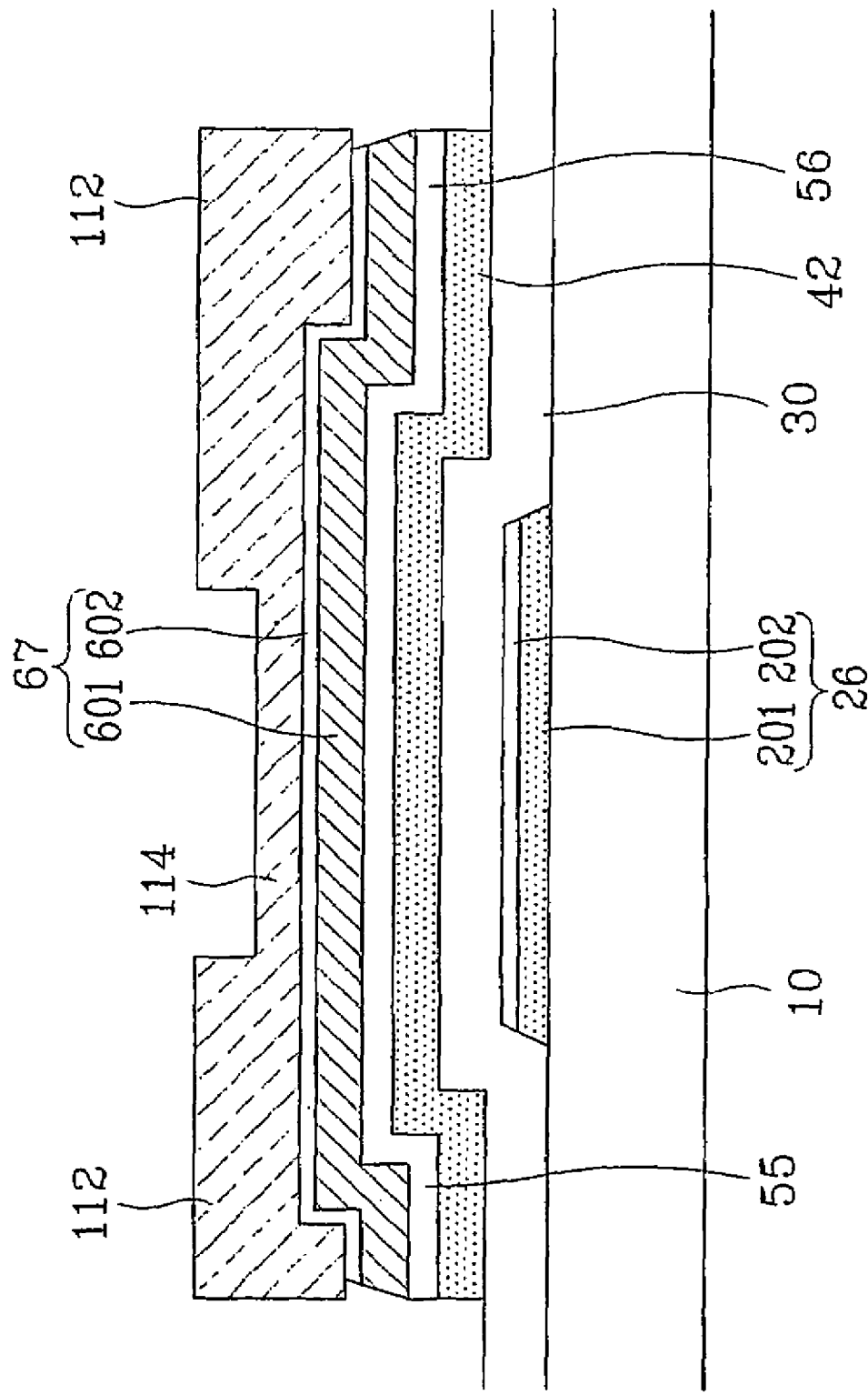

First, as shown in FIGS. 16A and 16B, the exposed portions of the conductive layer 60 on the other areas B are removed to expose the underlying portions of the intermediate layer 50. Both dry etch and wet etch are selectively used in this step and preferably performed under the condition that the conductive layer 60 is easily etched and the photoresist pattern 112 and 114 are hardly etched. However, since it is hard to identify the above-described condition for dry etch, and the dry etch may be performed under the condition that the photoresist pattern 112 and 114 and the conductive layer 60 are etched simultaneously. In this case, the first portion 114 for dry etch is preferably made to be thicker than that for the wet etch to prevent the removal of the first portion 114 and thus the exposure of the underlying portions of the conductive layer 60.

Both of the dry etching and the wet etching are suitable for the conductive layer 60 including one of Mo, MoW alloy, Al, Al alloy, and Ta. However, wet etching is preferred for the conductive layer 60 including Cr since it is hard to remove Cr by dry etching. An exemplary etchant used for wet etching of the conductive layer 60 of Cr is CeNHO$_3$, and exemplary gas mixtures used for dry etching of the conductive layer 60 of Mo or MoW are CF$_4$ and HCl, CF$_4$ and O$_2$, SF$_6$/Cl$_2$, and SF$_6$/O$_2$.

In the second embodiment of the present invention, the conductive layer 60 includes the metal film 201 of Cr and the metal oxide film 202 of CrOx, and the CrOx film 202 may be patterned by dry etching while the Cr film 201 may be patterned by wet etching. As described above, since the wet etching isotropically etches the target, portions of the Cr film 201 under the CrOx film 3 may be undercut to cause poor profiles of other layers formed later. Therefore, it is preferable that both the CrOx film 202 and the Cr film 201 is etched by the same etching technique, i.e., either by wet etching or by dry etching to form a tapered structure. In this embodiment of the present invention, the Cr film 201 and the CrOx film 202 are patterned by wet etching using an etchant including 8-12% Ce(NH$_4$)$_2$(NO$_3$)$_6$, 10-20% NH$_3$ and remaining ultra pure water to obtain a wire structure with an inclination angle of about 30-50 degrees. The simultaneous etching of the Cr film 201 and the CrOx film 202 simplifies the manufacturing process and the tapered structure gives fine profiles of other layers formed later.

As a result, as shown in FIG. 16A and FIG. 16B, only the portions of the conductive layer 60 on the channel areas C and the data areas A, that is, the source/drain ("S/D") conductors 67 and the storage capacitor conductors 64 are left and the remaining portions of the conductive layer 60 on the remaining areas B are removed to expose the underlying portions of the intermediate layer 50. Here, the S/D conductors 64 have substantially the same planar shapes as the data wire 62, 64, 65, 66 and 68 except that the source electrodes 65 and the drain electrodes 66 are not disconnected from but connected to each other. When using dry etch, the thickness of the photoresist pattern 112 and 114 is reduced to an extent.

Figure 17A:
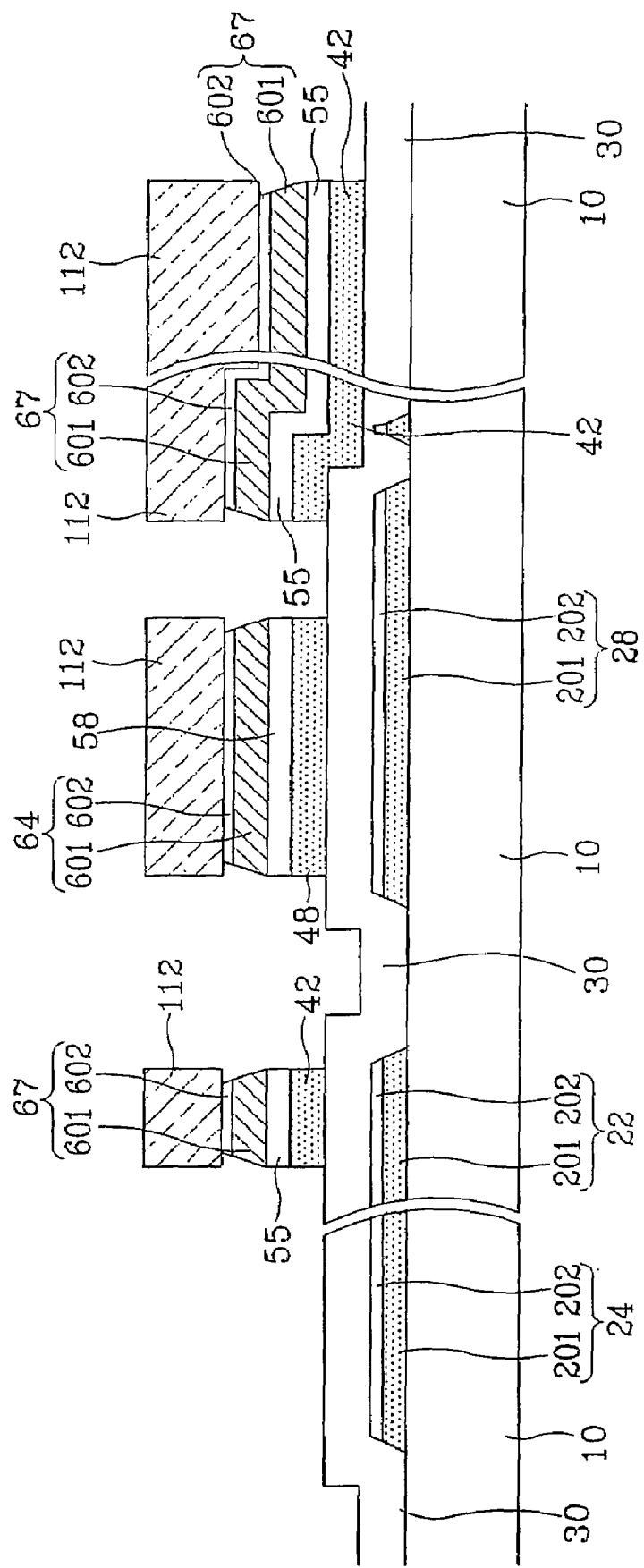
Figure 17B:
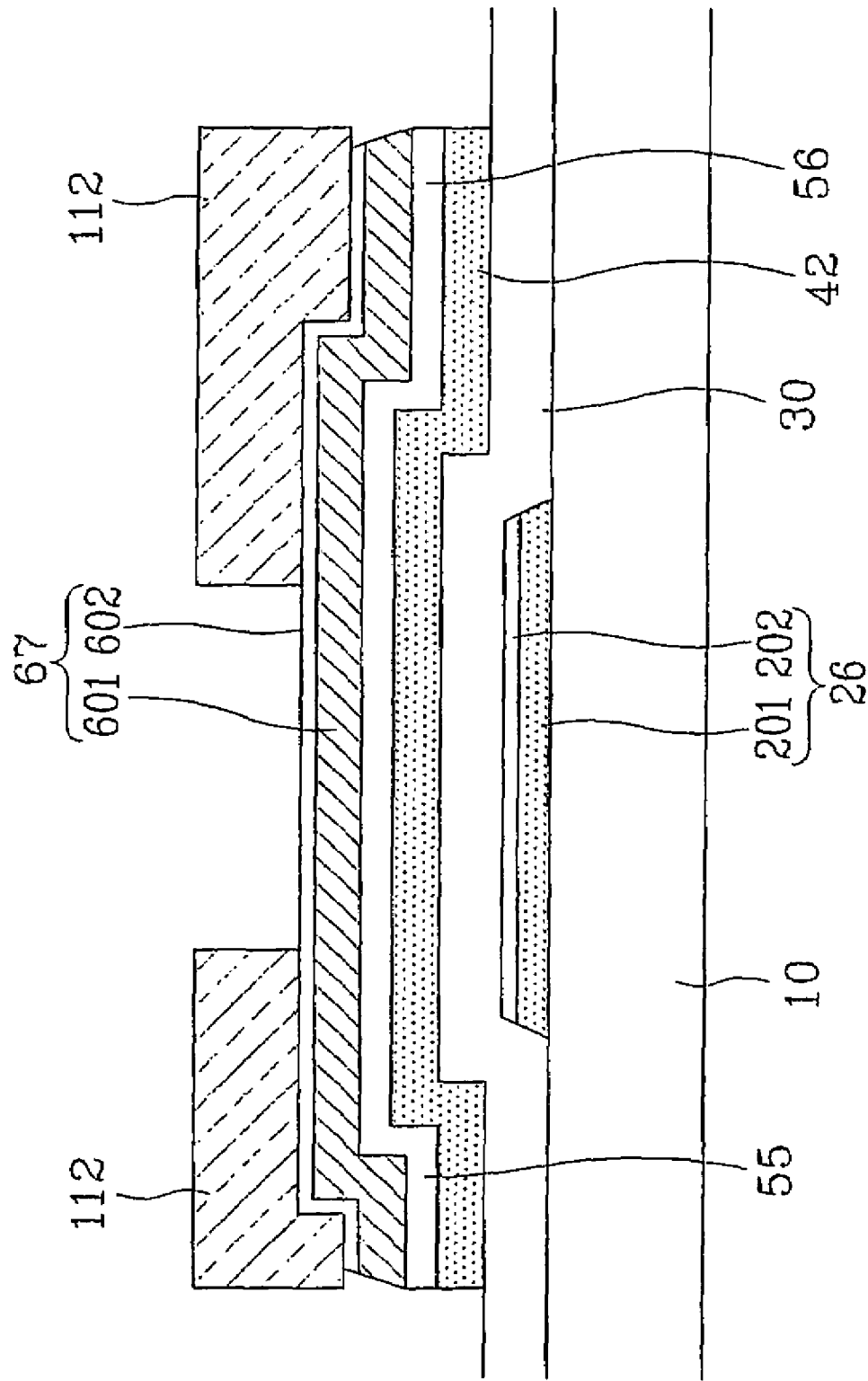

Next, as shown in FIG. 17A and FIG. 17B, the exposed portions of the intermediate layer 50 and the underlying portions of the semiconductor layer 40 on the areas B as well as the first portion 114 of the photoresist pattern 112 and 114 are removed by dry etch. The etching is performed under the conduction that the photoresist pattern 112 and 114, the intermediate layer 50 and the semiconductor layer 40 are easily etched and the gate insulating film 30 is hardly etched. (It is noted that etching selectivity between the intermediate layer and the semiconductor layer is nearly zero.) In particular, it is preferable that the etching ratios for the photoresist pattern 112 and 114 and the semiconductor layer 40 are nearly the same. For instance, the etched thicknesses of the photoresist pattern 112 and 114 and the semiconductor layer 40 can be nearly the same by using a gas mixture of SF$_6$ and HCl, or a gas mixture of SF$_6$ and O$_2$. When the etching ratios for the photoresist pattern 112 and 114 and for the semiconductor pattern 40 are the same, the initial thickness of the first portion 114 is equal to or less than the sum of the thickness of the semiconductor layer 40 and the thickness of the intermediate layer 50.

Consequently, as shown in FIGS. 17A and 17B, the first portions 114 on the channel areas C are removed to expose the underlying portions of the S/D conductors 67, and the portions of the intermediate layer 50 and the semiconductor layer 40 on the remaining areas B are removed to expose the underlying portions of the gate insulating film 30. In the meantime, the second portions 112 on the data areas A are also etched to become thinner. Moreover, the semiconductor pattern 42 and 48 is completed in this step. The reference numerals 57 and 58 refer to S/D ohmic contacts under the S/D conductors 67 and storage-capacitor ohmic contacts under the storage capacitor conductors 64, respectively.

Then, photoresist remnants left on the surface of the S/D conductors 67 on the channel areas C are removed by ashing.

Figure 18A:
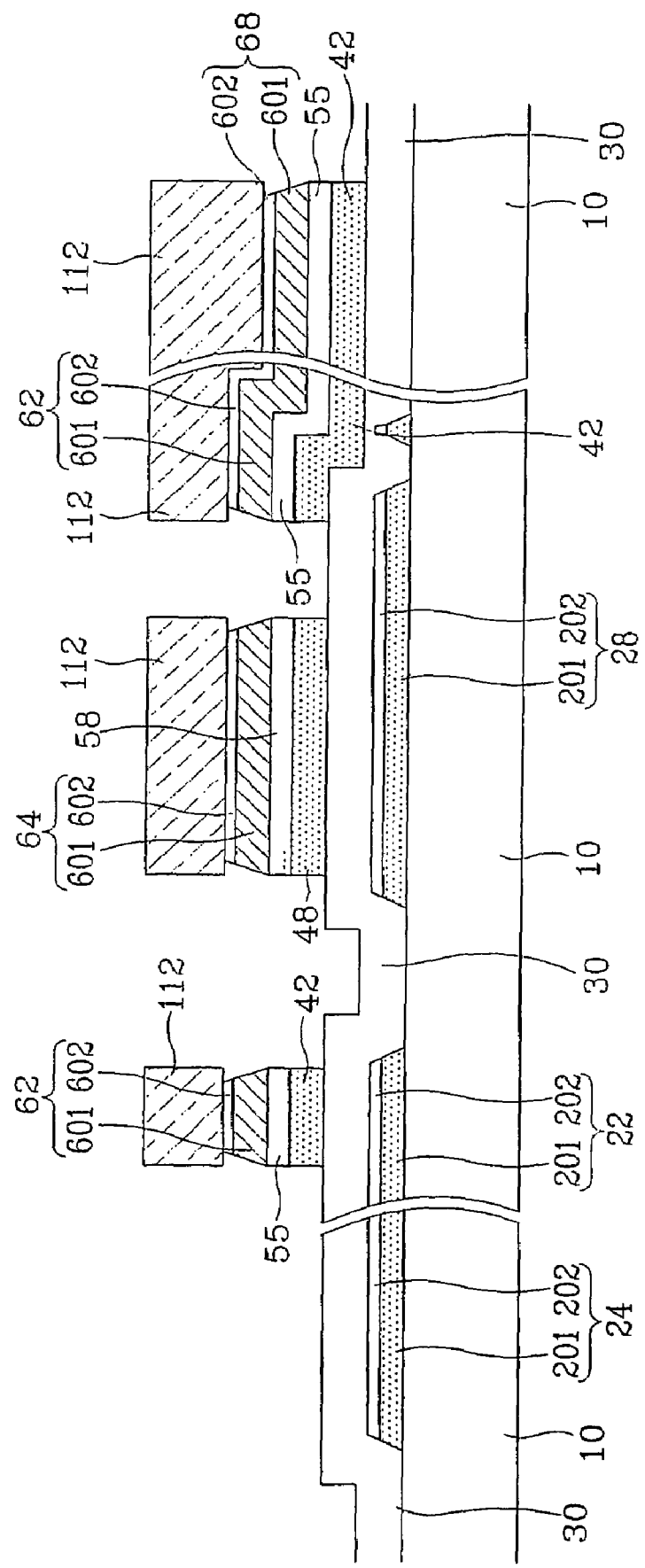
Figure 18B:
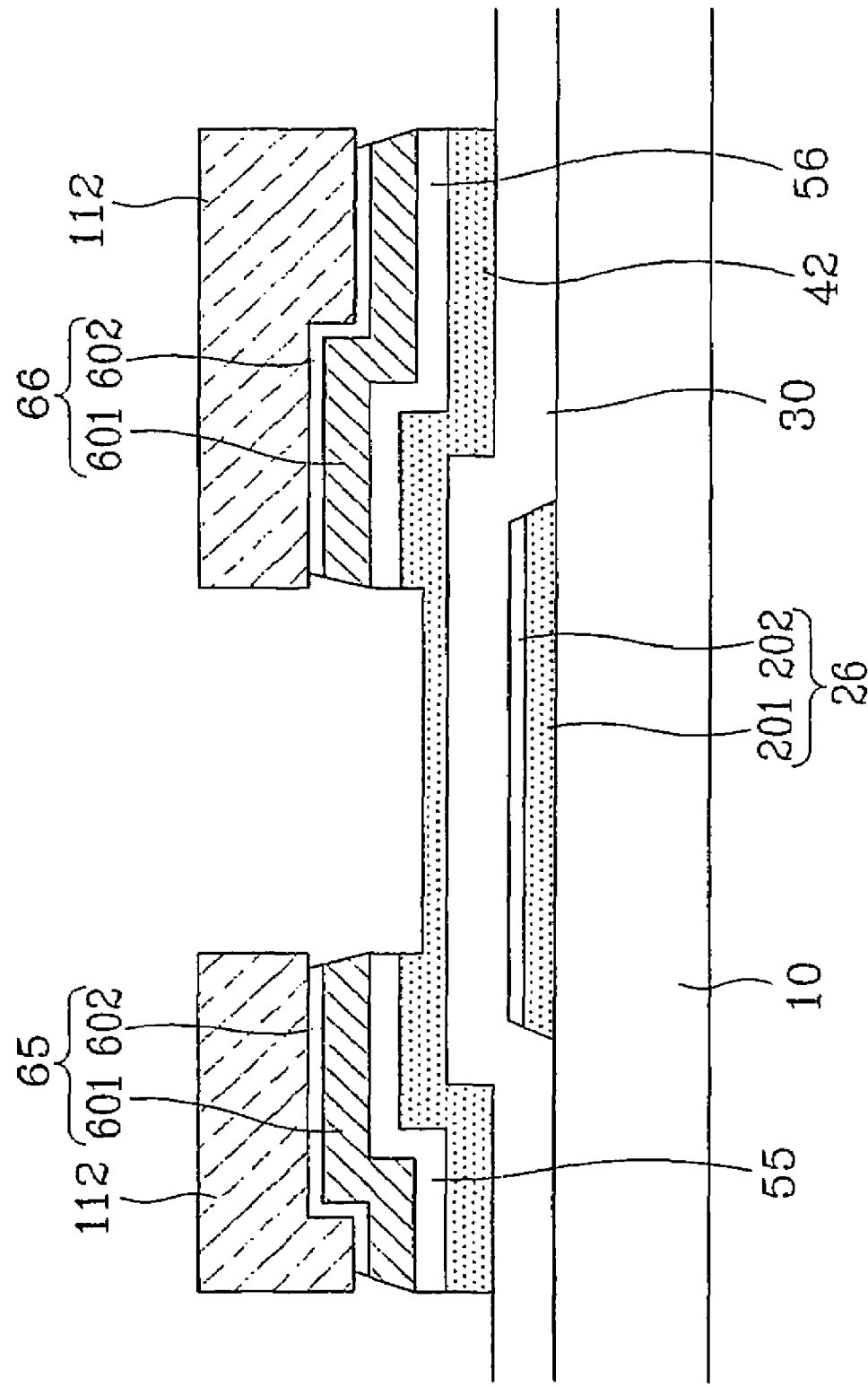

Next, as shown in FIGS. 18A and 18B, portions of the S/D conductors 67 and the underlying portions of the S/D ohmic contacts 57 on the channel areas C are etched to be removed. Here, the etching of both the S/D conductors 67 and the S/D ohmic contacts 57 may be done using only dry etching. Alternatively, the S/D conductors 67 are etched by wet etching and the S/D ohmic contacts 57 are etched by dry etching.

Accordingly, the source electrodes 65 and the drain electrodes 66 are separated from each other, and, simultaneously, the data wire 62, 64, 65, 66 and 68 and the ohmic contact pattern 55, 56 and 58 thereunder are completed.

Finally, the second portions 112 of the photoresist pattern 112 and 114 left on the data areas A are removed. Alternatively, the second portions 112 are removed after the portions of the S/D conductors 67 on the channel areas C are removed and before the underlying portions of the S/D ohmic contacts 57 are removed.

As described above, wet etching and dry etching may be performed one after the other, but only dry etching may be used. The latter is relatively simple but it is not easy to find a proper etching condition compared with the former. On the contrary, it is easy to find a proper etching condition for the former case but the former is relatively complicated compared with the latter.

Figure 19A:
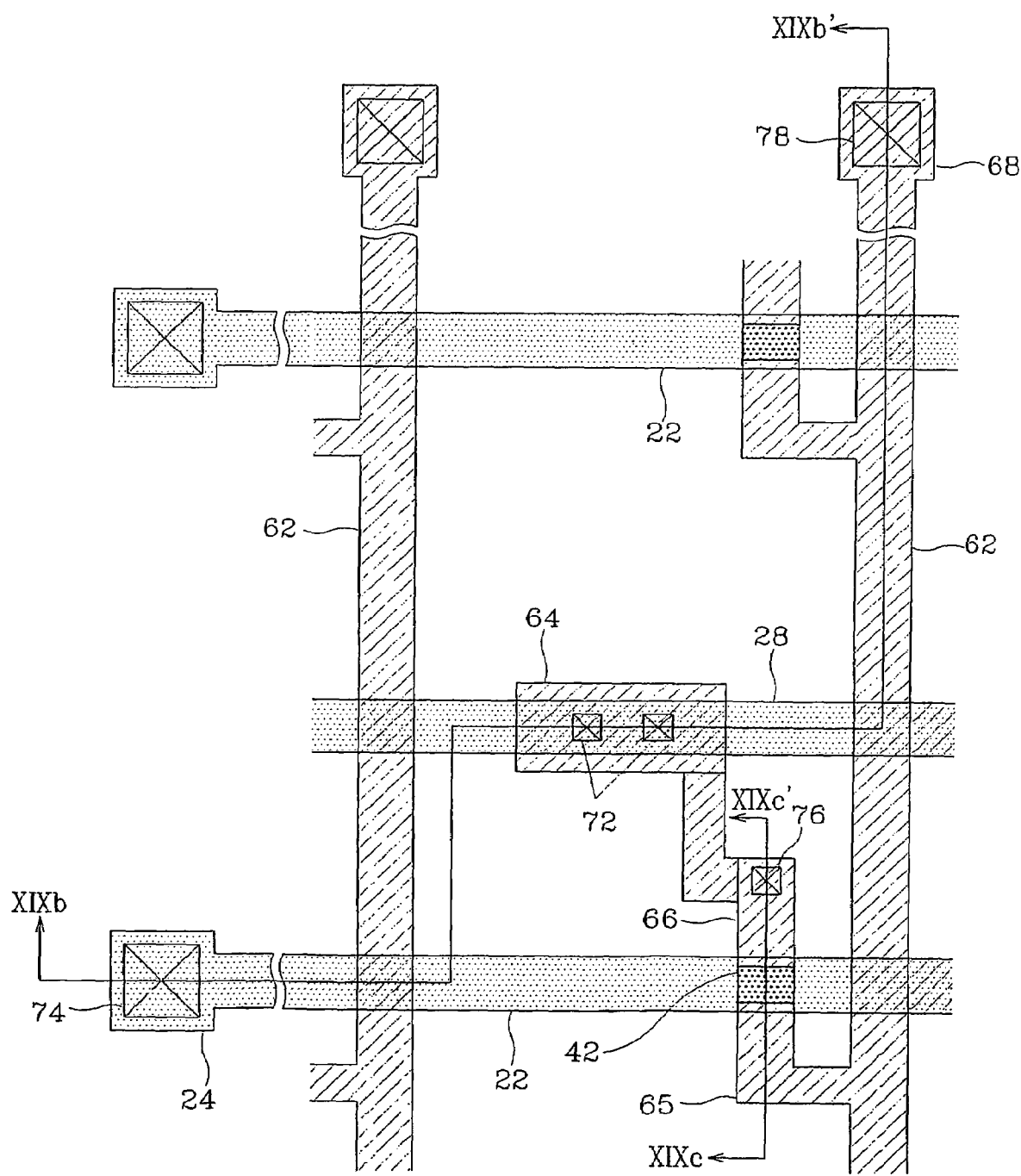
FIG. 19A is a layout view of the TFT array panel in the step following the step illustrated in FIGS. 18A and 18B.
Figure 19B:
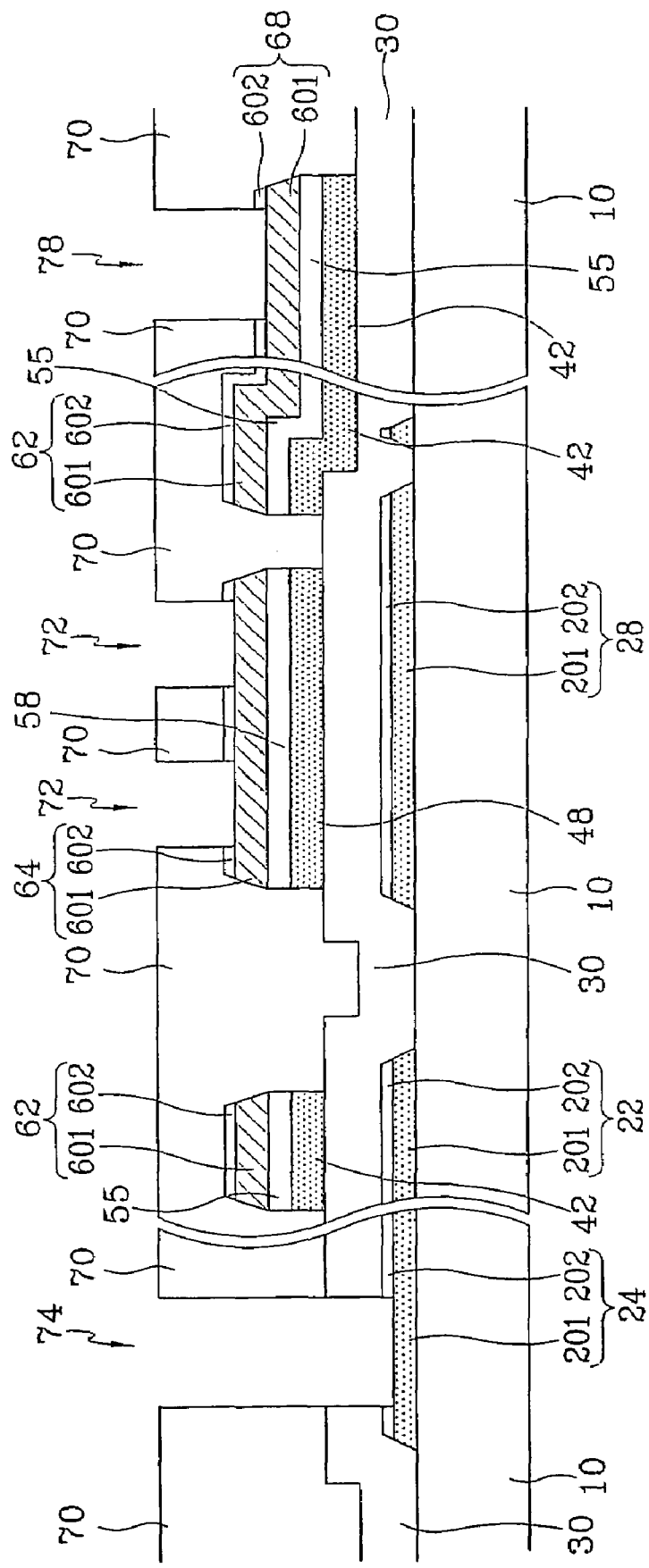

After the data wire 62, 64, 65, 66 and 68 is formed as described above, SiNx, SiOC or SiOF is deposited by CVD or a photosensitive insulating film is coated to form a passivation layer 70. As shown in FIGS. 19A to 19C, the passivation layer 70 as well as the gate insulating film 30 is etched using a mask to form a plurality of contact holes 72, 74, 76 and 78 exposing the storage capacitor conductors 64, the gate pads 24, the drain electrodes 66 and the data pads 68.

Finally, as shown in FIGS. 10 to 12, ITO, IZO or reflective conductive material with thickness of 400-500 Å is deposited and etched using a mask to form a plurality of pixel electrodes 82 connected to the drain electrodes 66 and the storage capacitor conductors 64, a plurality of subsidiary gate pads 86 connected to the gate pads 24, and a plurality of subsidiary data pads 88 connected to the data pads 68.

Since the data wire 62, 64, 65, 66 and 68, the ohmic contact pattern 55, 56 and 58 thereunder acid and the semiconductor pattern 42 and 48 thereunder are formed using a single mask, and the source electrode 65 and the drain electrode 66 are separated from each other in this process, the second embodiment of the present invention gives a simple manufacturing, method as well as the advantage which the first embodiment gives.

Although only the structure that the red, green and blue color filters R, G and B provided on the upper panel 200 has been described in the first and the second embodiments of the present invention, the red, green and blue color filters may be provided between the passivation layer 70 on the TFTs and the pixel electrodes 82, or under the gate wire 22, 24, 26 and 28 located under the TFTs.

As described above, in TFTs for an LCD according to the embodiments of the present invention, the gate lines, the data lines and the color filters can block the light leakage between the pixel areas and are displayed in dark colors so that a separate black matrix need not be provided on the color filter panel, thereby securing both aperture ratio of the pixel and high contrast ratio.

What is claimed is:

1. A thin film transistor array panel comprising:
   a gate wire formed on an insulating substrate and including a gate line and a gate electrode connected to the gate line;
   a gate insulating film covering the gate wire;
   a semiconductor layer formed on the gate insulating film;
   a data wire formed on the gate insulating film or the semiconductor layer and including a data line, a source electrode connected to the data line and located on the semiconductor layer and a drain electrode formed on the semiconductor layer and located opposite the source electrode with respect to the gate electrode;
   a passivation layer covering the data wire; and
   a pixel electrode including a transparent conductive material or a reflective conductive material and connected to the drain electrode,
   wherein the gate wire or the data wire comprises a metal film including a conductive material disposed on the insulating substrate or the gate insulating film and an opaque metal oxide film including an oxide of a conductive material disposed on the metal film,
   wherein the opaque metal oxide film of the gate wire and the data wire block light, and a side of the metal film is uncovered by the opaque metal oxide film.

2. The thin film transistor array panel of claim 1, wherein the metal film comprises one of Cr, Mo, Mo alloy, Al and Al alloy.

3. The thin film transistor array panel of claim 1, wherein the opaque metal oxide film comprises one of oxides of Cr, Mo, Mo alloy, Al and Al alloy.

4. The thin film transistor array panel of claim 1, wherein the conductive material included in the metal film and the conductive material included in the opaque metal oxide film are substantially the same.

5. The thin film transistor array panel of claim 1, wherein the gate wire further includes a gate pad connected to the gate line, and the data wire further includes a data pad connected to the data line, and the thin film transistor array panel further comprises:
   a subsidiary gate pad including substantially the same layer as the pixel electrode and connected to the gate pad; and
   a subsidiary data pad including substantially the same layer as the pixel electrode connected to the data pads.

6. The thin film transistor array panel of claim 1, wherein the passivation film comprises SiOC, SiOF, SiNx or an organic insulating material.

7. The thin film transistor array panel of claim 1, wherein the semiconductor layer has substantially the same planar shape as the data wire excluding a channel portion between the source electrode and the drain electrode.

8. The thin film transistor array panel of claim 1, wherein the pixel electrode is located on the passivation layer, and the pixel electrode and the drain electrode are connected to each other via a first contact hole provided in the passivation layer.

9. The thin film transistor array panel of claim 1, wherein the opaque metal oxide film is formed on an entire top substantially horizontal surface of at least one of the data wire and the gate wire.

10. The thin film transistor array panel of claim 1, further comprising a plurality of color filters facing the pixel electrodes, wherein the plurality of color filters block light.

11. The thin film transistor array panel of claim 10, wherein portions of adjacent color filters of the plurality of color filters overlap with each other.

12. The thin film transistor array panel of claim 1, wherein the gate wire and the data wire transmits signals and block light leakage between pixel areas.

13. The thin film transistor array panel of claim 8, wherein the drain electrode comprises the metal film and the opaque metal oxide film, and the pixel electrode is connected to the metal film of the drain electrode.

14. The thin film transistor array panel of claim 1, wherein the side of the metal film includes opposing sidewalls defining the metal film and the sidewalls are uncovered by the opaque metal oxide film.

* * * * *